(12) United States Patent
Lou et al.

(10) Patent No.: US 12,489,561 B2
(45) Date of Patent: *Dec. 2, 2025

(54) RADIO DATA TRANSMISSIONS WITH LOW-DENSITY PARITY-CHECK CODES

(71) Applicant: InterDigital Patent Holdings, Inc., Wilmington, DE (US)

(72) Inventors: Hanqing Lou, Syosset, NY (US); Chunxuan Ye, San Diego, CA (US); Fengjun Xi, San Diego, CA (US); Kyle Pan, Saint James, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,217

(22) Filed: Sep. 29, 2023

(65) Prior Publication Data

US 2024/0031064 A1 Jan. 25, 2024

Related U.S. Application Data

(63) Continuation of application No. 16/764,317, filed as application No. PCT/US2018/060967 on Nov. 14, 2018, now Pat. No. 11,817,956.

(Continued)

(51) Int. Cl.
*H04L 1/1607* (2023.01)
*H04L 1/1812* (2023.01)
(Continued)

(52) U.S. Cl.
CPC .......... *H04L 1/1614* (2013.01); *H04L 1/1812* (2013.01); *H04L 1/1861* (2013.01);
(Continued)

(58) Field of Classification Search
CPC ... H04L 1/1614; H04L 1/1812; H04L 1/1861; H04L 5/0055; H04L 1/0057; H04L 5/0007
See application file for complete search history.

(56) References Cited

U.S. PATENT DOCUMENTS 9,014,210 B2 * 4/2015 Chen ..................... H04L 5/0055
370/468
9,198,199 B2 * 11/2015 Larsson ................ H04L 1/0073
(Continued)

FOREIGN PATENT DOCUMENTS

| CN | 102511143 A | 6/2012 |
|----|-------------|--------|
| CN | 104040931 A | 9/2014 |

(Continued)

OTHER PUBLICATIONS

"A Compressed HARQ Feedback for Device-to-Device Multicast Communications"; Du et al.; 2012 IEEE Vehicular Technology Conference (VTC Fall) (Year: 2012).*

(Continued)

*Primary Examiner* — Benjamin H Elliott, IV
(74) *Attorney, Agent, or Firm* — Jamie T. Nguyen

(57) ABSTRACT

Methods, apparatus, systems, architectures and interfaces for compressing hybrid automatic repeat request acknowledgement (HARQ-ACK) feedback bits performed by a wireless transmit/receive unit (WTRU) receiving a transmit block (TB) including code block group (CBG) data are provided. The method includes receiving, by the WTRU, information associated with transmitting compressed HARQ-ACK feedback information, receiving, by the WTRU, a TB; determining, by the WTRU, a countdown downlink assignment index (CD_DAI) associated with the received TB; generating, by the WTRU, the compressed HARQ-ACK feedback information by compressing HARQ-ACK feedback bits associated with the received TB; and on (Continued)

US 12,489,561 B2

Page 2 condition that: (1) the CD_DAI is equal to zero or (2) the WTRU determines to provide feedback information, transmitting the compressed HARQ-ACK feedback information.

20 Claims, 15 Drawing Sheets

Related U.S. Application Data

(60) Provisional application No. 62/684,975, filed on Jun. 14, 2018, provisional application No. 62/586,546, filed on Nov. 15, 2017.

(51) Int. Cl.
*H04L 1/1829* (2023.01)
*H04L 5/00* (2006.01)
*H04L 1/00* (2006.01)

(52) U.S. Cl.
CPC .......... *H04L 5/0055* (2013.01); *H04L 1/0057* (2013.01); *H04L 5/0007* (2013.01)

(56) References Cited

U.S. PATENT DOCUMENTS

| | | | | |
|---|---|---|---|---|
| 9,432,879 | B2* | 8/2016 | Asterjadhi | H04W 4/00 |
| 10,375,681 | B2* | 8/2019 | Papasakellariou | H04L 1/1854 |
| 10,420,089 | B2* | 9/2019 | Nammi | H04L 1/0072 |
| 10,530,528 | B2* | 1/2020 | Park | H04L 1/00 |
| 10,931,426 | B2* | 2/2021 | Desai | H04L 1/1861 |
| 11,817,956 | B2* | 11/2023 | Lou | H04L 1/1614 |
| 2011/0103323 | A1* | 5/2011 | Wang | H04W 72/21 370/328 |
| 2013/0114530 | A1* | 5/2013 | Chen | H04W 72/23 370/329 |
| 2013/0223210 | A1* | 8/2013 | Asterjadhi | H04W 28/06 370/230 |
| 2014/0362832 | A1* | 12/2014 | Rudolf | H04L 1/1822 370/336 |
| 2016/0233999 | A1* | 8/2016 | Chendamarai Kannan | H04W 72/20 |
| 2017/0141903 | A1* | 5/2017 | Xu | H04L 5/0057 |
| 2018/0278380 | A1* | 9/2018 | Kim | H04L 1/1671 |
| 2018/0310257 | A1* | 10/2018 | Papasakellariou | H04W 52/30 |
| 2019/0037586 | A1* | 1/2019 | Park | H04L 5/00 |
| 2019/0150122 | A1* | 5/2019 | Ying | H04W 72/23 370/329 |
| 2019/0363840 | A1* | 11/2019 | Wang | H04L 1/1854 |
| 2019/0379489 | A1* | 12/2019 | Hwang | H04L 1/0063 |
| 2020/0059327 | A1* | 2/2020 | Kini | H04L 5/0055 |
| 2020/0084789 | A1* | 3/2020 | Wang | H04L 1/1614 |
| 2020/0100139 | A1* | 3/2020 | Kim | H04L 1/1812 |
| 2020/0196335 | A1* | 6/2020 | Lei | H04L 1/1614 |
| 2020/0220666 | A1* | 7/2020 | Xue | H04L 1/0061 |
| 2020/0221455 | A1* | 7/2020 | Lei | H04W 72/0446 |
| 2020/0366420 | A1* | 11/2020 | Gou | H04L 1/1896 |
| 2020/0374029 | A1* | 11/2020 | Yeo | H04L 1/0058 |
| 2020/0374040 | A1* | 11/2020 | Lou | H04L 5/0055 |
| 2021/0075561 | A1* | 3/2021 | Baldemair | H04L 1/1614 |
| 2024/0031064 | A1* | 1/2024 | Lou | H04L 5/0055 |

FOREIGN PATENT DOCUMENTS

| | | |
|---|---|---|
| CN | 104137458 A | 11/2014 |
| TW | 201338480 A | 3/2018 |
| WO | WO 2013141790 A2 | 9/2013 |
| WO | WO 2015165166 A1 | 11/2015 |
| WO | WO 2016123372 A1 | 8/2016 |

OTHER PUBLICATIONS

"Discussion on CBG based HARQ-ACK Design"; Fujitsu; 3GPP TSG RAN WG1 Meeting #90 R1-1712745 Prague, Czech Republic, Aug. 21-25, 2017 (Year: 2017).*
Samsung, "CBG-Based DL/UL Retransmissions", 3GPP Tdoc R1-1717664; 3GPP TSG RAN WG1 Meeting 90bis; Prague, CZ, Oct. 9-13, 2017, 9 pages.
Nokia, "Remaining aspects of HARQ management", 3GPP Tdoc R1-1718621; 3GPP TSG RAN WG1 Meeting 90bis; Prague, Czech, Oct. 9-13, 2017, 9 pages.
3rd Generation Partnership Project; Technical Specification Group Radio Access Network; NR; Multiplexing and channel coding (Release 15), 3GPP TS 38.212 V1.0.0, Sep. 2017, 13 pages.
Fujitsu, "Discussion on HARQ-ACK feedback for DL CBG based (re)transmission", 3GPP Tdoc R1-1717720, 3GPP TSG RAN WG1 Meeting #90bis, Prague, Czech Republic, Oct. 9-13, 2017, 13 pages.
Panasonic, "HARQ-ACK codebook for CBG-based transmission", 3GPP Tdoc R1-1718287, 3GPP TSG RAN WG1 Meeting #90bis, Prague, CZ, Oct. 9-13, 2017, 3 pages.
Huawei et al., "Discussion on CBG-based feedback", 3GPP Tdoc R1-1712202, 3GPP TSG RAN WG1 Meeting #90, Prague, Czech Republic, Aug. 21-25, 2017, 4 pages.
3rd Generation Partnership Project; Technical Specification Group Radio Access Network; Evolved Universal Terrestrial Radio Access (E-UTRA); Physical layer procedures (Release 14), 3GPP TS 36.213 V14.4.0, Sep. 2017, 49 pages.
Wilus Inc., "HARQ-ACK multiplexing for CBG-based (re)transmission", 3GPP Tdoc R1-1714396, 3GPP TSG RAN WG1 Meeting #90, Prague, Czech Republic, Aug. 21-25, 2017, 5 pages.
LG Electronics, "Considerations on HARQ process and feedback for NR", 3GPP Tdoc R1-1717966; 3GPP TSG RAN WG1 Meeting #90bis; Prague, CZ, Oct. 9-13, 2017, 14 pages.
Samsung, "HARQ-ACK Feedback for CBG-Based Retransmissions", 3GPP Tdoc R1-1713643, 3GPP TSG RAN WG1 Meeting #90, Prague, Czechia, Aug. 21-25, 2017, 5 pages.
Samsung, "CA Operation Aspects", 3GPP Tdoc R1-1717676; 3GPP TSG RAN WG1 Meeting 90bis; Prague, CZ, Oct. 9-13, 2017, 5 pages.
Lenovo et al., "HARQ-ACK feedback for CBG-based retransmission", 3GPP Tdoc R1-1712692, 3GPP TSG RAN WG1 Meeting #90, Prague, P.R. Czech, Aug. 21-25, 2017, 4 pages.
LG Electronics, "Support of HARQ-ACK multiplexing/bundling for NR", 3GPP Tdoc R1-1713194; 3GPP TSG RAN WG1 Meeting #90; Prague, Czechia, Aug. 21-25, 2017, 9 pages.

* cited by examiner

| | CBG0 | CBG1 | CBG2 | CBG3 | CBG4 | CBG5 | CBG6 | CBG7 | TB HARQ-ACK |
|---|---|---|---|---|---|---|---|---|---|
| TB0 | 1 | 1 | 1 | 1 | 1 | 1 | 1 | 1 | 1 |
| TB1 | 1 | 1 | 1 | 1 | 1 | 0 | 1 | 1 | 0 |
| TB2 | 1 | 1 | 1 | 1 | 1 | 1 | 1 | 1 | 1 |
| TB3 | 1 | 1 | 1 | 0 | 1 | 1 | 1 | 1 | 0 |
| TB1 bundled CBG HARQ-ACK | 1 | 1 | 1 | | 1 | 1 | 1 | 1 | |

FIG. 6

RADIO DATA TRANSMISSIONS WITH LOW-DENSITY PARITY-CHECK CODES

CROSS REFERENCE TO RELATED APPLICATIONS

This application is a continuation of U.S. patent application Ser. No. 16/764,317 filed May 14, 2020, which is the National Stage entry under 35 U.S.C. § 371 of Patent Cooperation Treaty Application PCT/US2018/060967, filed Nov. 14, 2018, which claims the benefit of U.S. Provisional Application No. 62/586,546, filed Nov. 15, 2017 and U.S. Provisional Application No. 62/684,975 filed Jun. 14, 2018, the contents of each of which are incorporated by reference herein.

BACKGROUND

The present invention relates to the field of communications and, more particularly, to methods, apparatus, systems, architectures and interfaces for communications in an advanced or next generation wireless communication system, including communications carried out using a new radio and/or new radio access technology and involve transmission of reference signals used for determining channel state information.

SUMMARY

Methods, apparatus, systems, architectures and interfaces for compressing hybrid automatic repeat request acknowledgement (HARQ-ACK) feedback bits performed by a wireless transmit/receive unit (WTRU) receiving a transmit block (TB) including code block group (CBG) data are provided. The method includes receiving, by the WTRU, information associated with transmitting compressed HARQ-ACK feedback information; receiving, by the WTRU, a TB; on condition that a countdown downlink assignment index (CD_DAI) associated with the received TB is equal to zero, compressing, by the WTRU, HARQ-ACK feedback bits so as to generate the compressed HARQ-ACK feedback information; and transmitting the compressed HARQ-ACK feedback information.

Methods, apparatus, systems, architectures and interfaces for retransmission performed by a wireless transmit/receive unit (WTRU) transmitting a transmit block (TB) including code block group (CBG) data are provided. The method includes receiving, by the WTRU, compressed HARQ-ACK feedback information; determining a set of correctly received TBs satisfying TB={TB_m|C1_$m$=1}; determining a set of incorrectly received TBs satisfying TB={TB_m|C2_$m$=0}; retransmitting TBs included in the set of incorrectly received TBs; and retransmitting all CBGs satisfying {CBG$_{mn}$|C1$_m$=0 and C3$_n$=0}.

A representative device has circuitry, including any of a processor, memory, a receiver, and a transmitter; the representative device being for receiving a transmit block (TB) including code block group (CBG) data and compressing hybrid automatic repeat request acknowledgement (HARQ-ACK) feedback bits; the representative device being configured to receive information associated with transmitting compressed HARQ-ACK feedback information; receive a TB; on condition that a countdown downlink assignment index (CD_DAI) associated with the received TB is equal to zero, compress HARQ-ACK feedback bits so as to generate the compressed HARQ-ACK feedback information; and transmit the compressed HARQ-ACK feedback information.

A representative device has circuitry, including any of a processor, memory, a receiver, and a transmitter; the representative device being for retransmission performed by a wireless transmit/receive unit (WTRU) transmitting a transmit block (TB) including code block group (CBG) data, the WTRU configured to receive compressed HARQ-ACK feedback information; determine a set of correctly received TBs satisfying TB={TB_m|C1_$m$=1}; determine a set of incorrectly received TBs satisfying TB={TB_m|C2_$m$=0}; retransmit TBs included in the set of incorrectly received TBs; and retransmit all CBGs satisfying {CBG$_{mn}$|C1$_m$=0 and C3$_n$=0}.

BRIEF DESCRIPTION OF THE DRAWINGS

Furthermore, like reference numerals in the figures indicate like elements, and wherein:

FIG. 6 is a diagram illustrating a HARQ-ACK codebook design according to embodiments;

DETAILED DESCRIPTION

Figure 1A:
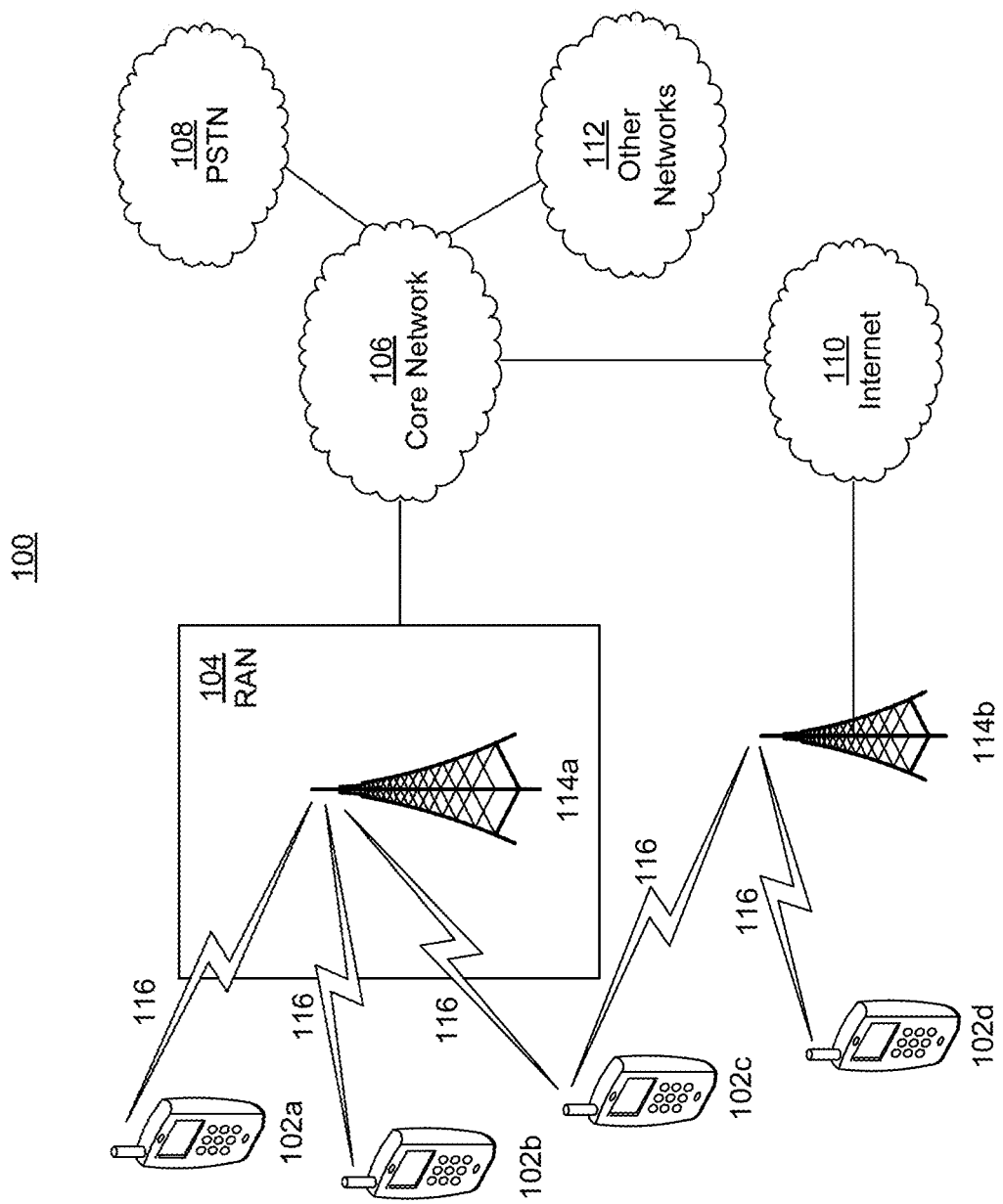
FIG. 1A is a system diagram illustrating an example communications system in which one or more disclosed embodiments may be implemented.

A detailed description of illustrative embodiments may now be described with reference to the figures. However, while the present invention may be described in connection with representative embodiments, it is not limited thereto and it is to be understood that other embodiments may be used or modifications and additions may be made to the described embodiments for performing the same function of the present invention without deviating therefrom.

Although the representative embodiments are generally shown hereafter using wireless network architectures, any number of different network architectures may be used including networks with wired components and/or wireless components, for example.

The design of the next generation of wireless systems is currently underway in the academia, industry, regulatory and standardization bodies. The IMT-2020 Vision sets the framework and overall objectives for the development of the next generation of wireless systems. To address an anticipated increase in wireless data traffic, demand for higher data rates, low latency and massive connectivity, the IMT-2020 Vision defines the main use cases that drive fifth generation (5G) design requirements: enhanced mobile broadband (eMBB), ultra-reliable low latency communications (URLLC), and massive machine type communications (mMTC). These use cases have widely different targets on peak data rates, latency, spectrum efficiency, and mobility.

Although the IMT-2020 Vision indicates not all of the key capabilities are equally important for a given use case, it is important to build flexibility in the 5G designs, to enable meeting expected use-case specific requirements and support multiple services. In this regard, 3rd Generation Partnership Project (3GPP) is conducting research and development for a new radio and/or new radio access technology (collectively referred to as "NR") for the advanced or next generation (e.g., 5G) wireless communication system in consideration of the main use cases and a variety of other/different applications along with their various needs and deployment scenarios and attendant (e.g., mandated specific) performance requirements thereof.

There are several deployment scenarios, including indoor hotspot, dense urban, rural, urban macro, high speed, etc., that 3GPP has discussed and/or defined for standards. Also, several use cases are defined, for example Enhanced Mobile Broadband (eMBB), Massive Machine Type Communications (mMTC) and Ultra Reliable and Low Latency Communications (URLLC). Different use cases may focus on different requirements, such as higher data rate, higher spectrum efficiency, low power and higher energy efficiency, lower latency and higher reliability, etc. Communications in these different use cases may involve determining a Transport Block Size (TBS). For example, for Long Term Evolution (LTE) deployment, a modulation and coding scheme (MCS) table may contains a MCS index and a corresponding modulation order and a TBS index. The TBS index, together with the number of Physical Resource Blocks (PRBs), may be used to determine the transport block size from a TBS table in a LTE deployment.

Example Networks for Implementation of the Embodiments

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
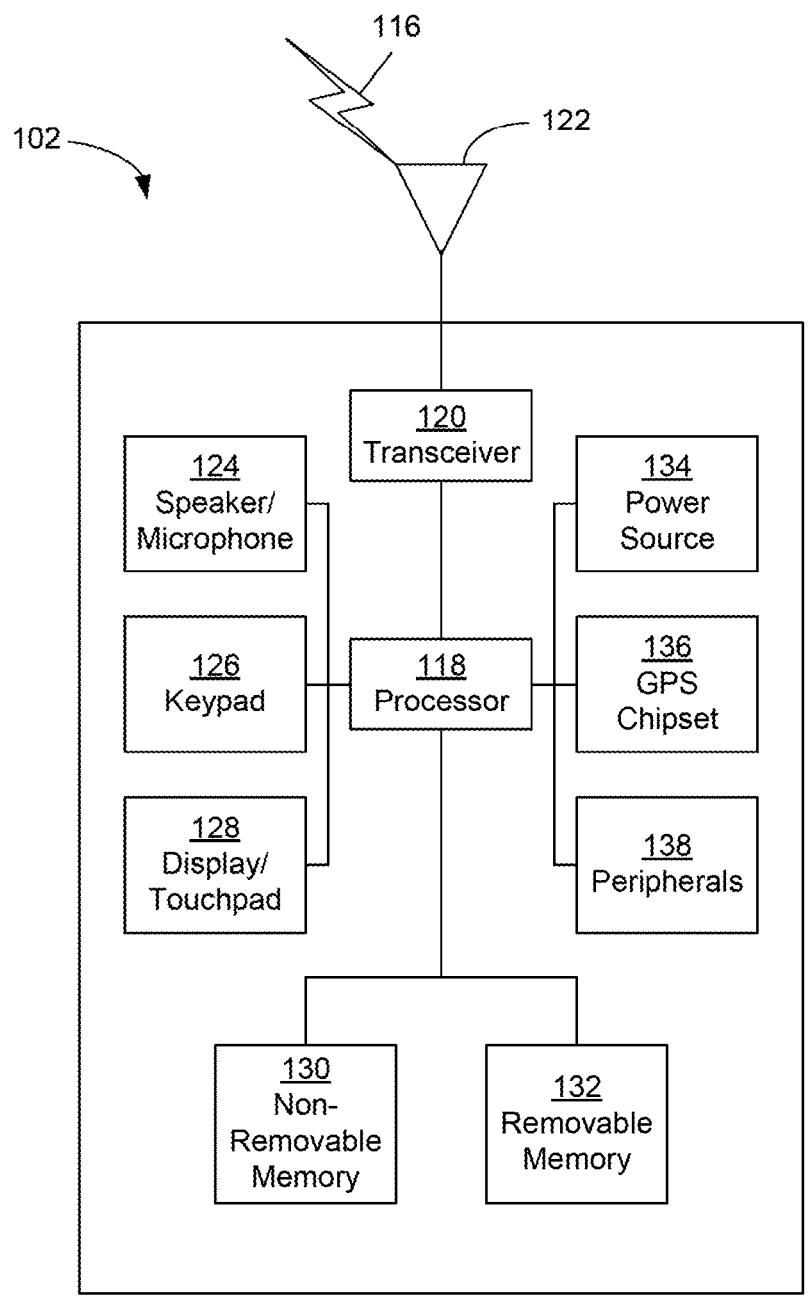
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
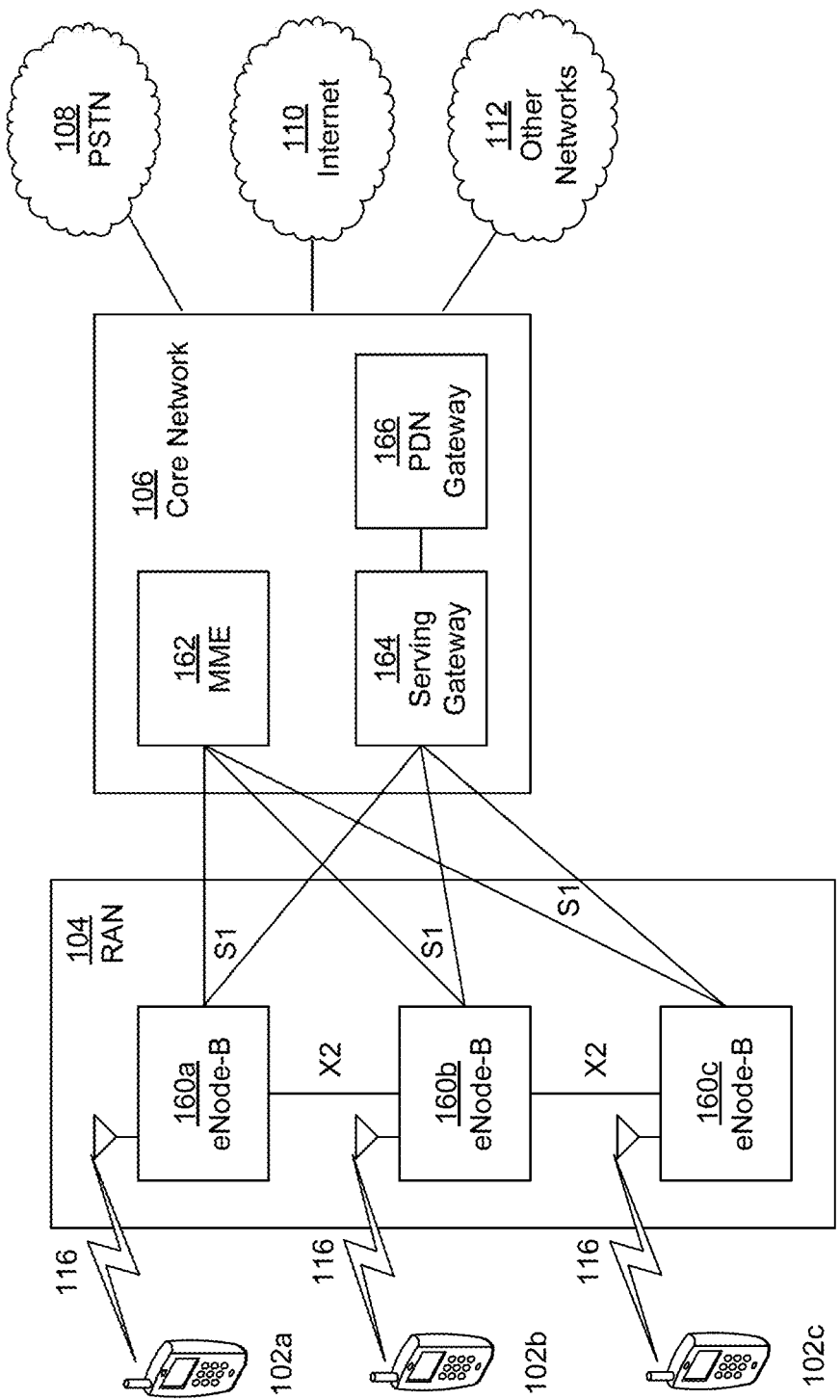
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
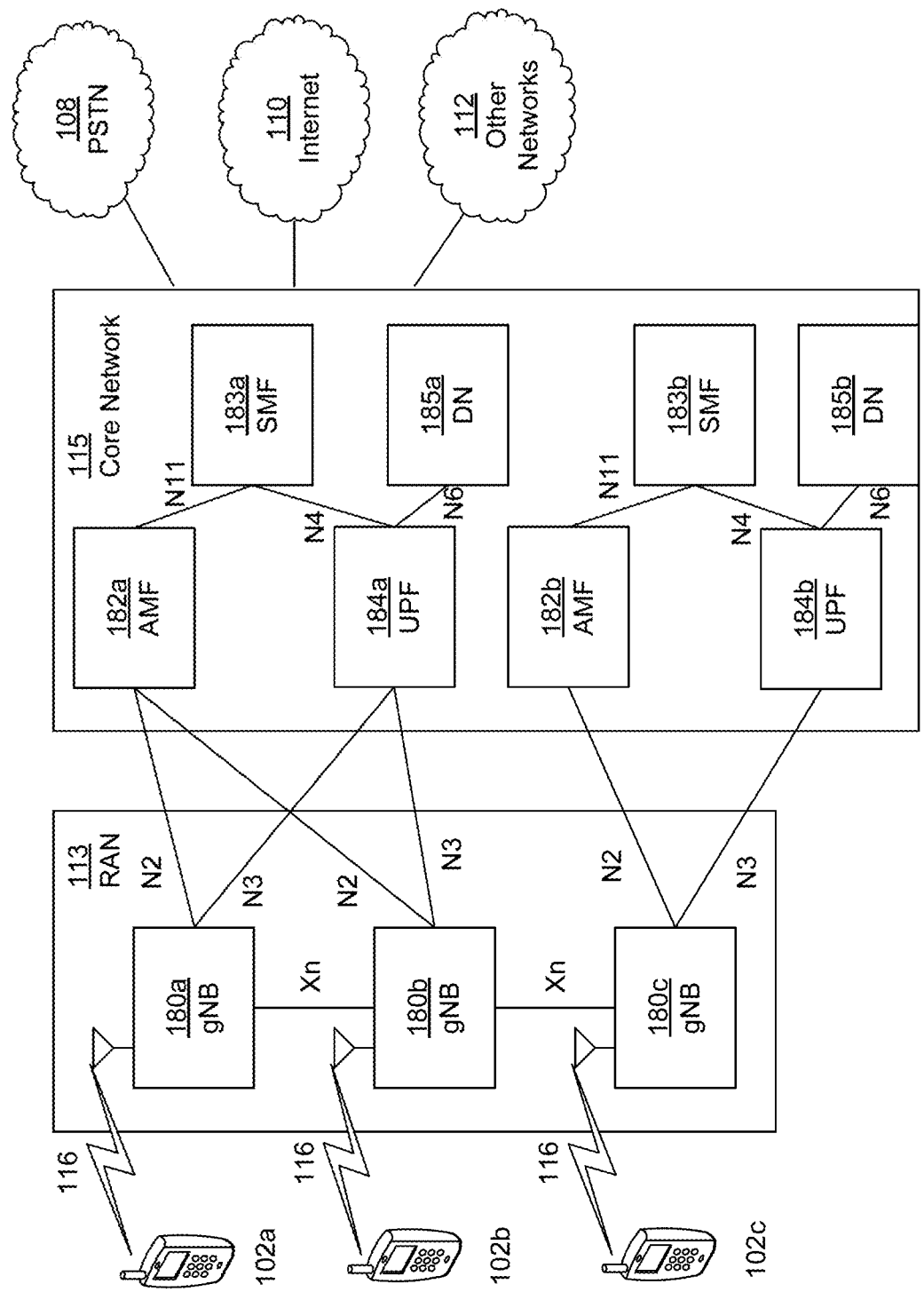
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In the case of New Radio (NR) deployment, an modulation and coding scheme (MCS) table may define a MCS index and a corresponding modulation order and target code rate (e.g., 1024). The target code rate may be provided directly in the MCS table. In contrast to an LTE deployment that uses a table, in the case of NR, the TBS size may be calculated (e.g. mainly calculated) from a formula. That is, the TBS size may be calculated according to the following agreement of 3GPP:

Calculate an "intermediate" number of information bits $N_{RE} \cdot v \cdot Q_m \cdot R$ where
  v is the number of layers,
  $Q_m$ is the modulation order, obtained from the MCS index
  R is the code rate, obtained from the MCS index
  $N_{RE}$ is number of resource elements
  $N_{RE}$=Y*# PRBs scheduled
When determining $N_{RE}$ (number of REs) within a slot
  Determine X=12*#OFDM symbols scheduled—Xd—Xoh
    Xd=#REs for DMRS per PRB in the scheduled duration
    Xoh=accounts for overhead from CSI-RS, CORESET, etc. One value for UL, one for DL.
    Xoh is semi-statically determined
  Quantize X into one of a predefined set of values, resulting in Y
  [8] values
    Should allow for reasonable accuracy for all transmission durations
    May depend on the number of scheduled symbols
    FFS: floor, ceiling or some other quantization
    Note: quantization may not be needed
    FFS: Quantization step should ensure the same TB size can be obtained between transmission and retransmission, irrespective of the number of layers used for the retransmission. otherwise Xd has to be independent of the number of layers
Obtain the actual TB size from the intermediate number of information bits according to the channel coding decisions In the case of NR, two Low-Density Parity Check (LDPC) base graphs (BGs) may be supported. For example, BG 1 may have a size of 46×68 and BG 2 may have a size of 42×52. In such example, BG 1 may be for high code rates and large block lengths, while BG 2 may be for low code rates and small block lengths. In the case of NR, there is agreement that BG2 may be used in a case of any of: 1) a code rate R≤¼, 2) a code block size (CBS)≤308 bits, or 3) a CBS≤3840 bits and a code rate R≤⅔; else, BG1 is used.

In a case of NR wherein the maximum CBS is used, the CBS may depend on the segmentation of a transport block (TB). For example, the maximum CBS for BG1 is 8448 bits, and the maximum CBS for BG2 is 3840 bits. The code rate R may be used for the selection of a maximum CBS from among the options of 8448 bits and 3840 bits. For example, if R≤¼, then a maximum CBS of 3840 bits is selected, otherwise, a maximum CBS of 8448 bits is selected. In the case of NR, the TBS determination may depend on the detailed structure of LDPC codes.

In the case of NR, TBS determination may not rely directly on a TBS table. In the case of NR, a large number of PRBs (up to 275 PRBs) may be supported and various possible OFDM symbols/slots ([1, 14]) may be used, which may result in a large TBS table. In the case of NR, the TBS determination may be based on a formula. However, the formula-based TBS calculation has low resolutions on the TBS step sizes. Hence, the intermediate TBS needs to be adjusted to obtain an actual TBS. This process may depend on the LDPC code structure.

Further, in the case of NR, selection between the two LDPC BGs may depend on the coding rate and the TBS. The coding rate may be different in an initial transmission and retransmissions. In a case where a receiver does not receive downlink control information (DCI) of an initial transmission, the receiver may determine an LDPC BG according to the coding rate of the retransmissions. However, in a further case where the coding rate of the initial transmission and retransmission are different, the receiver may use a wrong LDPC BGs for its decoding.

Transport Block Size Determination for New Radio

According to embodiments, a TBS size may be determined according to the following operations. A first operation may be to determine a service associated with data and to check a TBS table (for example, a designed, determined, configured, etc., TBS table) for these services. For example, in a case where the data belongs to ultra-reliable low latency communications (URLLC), voice over IP (VoIP), or other such service and/or special service, the designed TBS table is checked for these services. According to embodiments, a TBS table may be composed of MCS index $I_{MCS}$ and number of PRB $N_{PRB}$. Note that in LTE, the TBS table is composed of TBS index $I_{TBS}$ and number of PRB $N_{PRB}$.

According to embodiments, a second operation may be to determine an intermediate (or temporary) TBS size, which may be denoted by $TBS_{temp}$. It has been agreed, by 3GPP, that $TBS_{temp}$ may be calculated according to Formula 1:

$$TBS_{temp} = R \cdot Q_m \cdot v \cdot N_{RE} \quad \text{[Formula 1]}.$$

In the Formula 1 calculation of TBS_temp, the values for the code rate R and the modulation order Q_m are obtained directly from the MCS table, and the MCS index and the number of layers v is carried by and/or known from DCI. The number of resource elements N_RE is equal to the number of scheduled PRBs multiplied by the quantized number of REs (Y) within a slot. That is, N_RE=Y·# Scheduled PRBs. According to embodiments, the value of Y may depend on the actual number of REs (X) within a slot, which may be determined according to Formula 2:

$$X=12 \cdot \text{\#OFDM symbols/slot-}X\_d-X\_oh \quad \text{[Formula 2]},$$

wherein $X_d$ is the number of REs for DMRS per PRB in the scheduled duration, and $X_{oh}$ accounts for overhead from CSI-RS, CORESET, etc. According to embodiments, the value of $X_{oh}$ may be semi-statically determined and may be different for UL and DL, and the values of $X_d$ and $X_{oh}$ may change between first transmission and re-transmissions.

According to embodiments, the actual number of REs (X) may be quantized (Y) according to a variety of options. For example, at least two different ways/options of quantizing from X to Y are possible: (1) do not apply the quantization, and instead the quantization may be performed (e.g., applied) in Step 2 when determining the final TBS; and (2) apply floor based quantization, so that Y is always smaller than X. According to embodiments, quantization according to option two may ensure that the TBS size is not more than the data capacity carried by the available resources. For example, this could avoid additional puncturing at the stage of resource mapping or rate matching.

According to embodiments, a third operation may be to determine the TBS size, e.g., the actual/final TBS size, which may be denoted by $TBS_{final}$. According to embodiments, the quantization of $TBS_{temp}$ to $TBS_{final}$ may be to byte align $TBS_{final}$. For example, to ensure that $TBS_{final}$ is byte aligned, a TB may be equally partitioned to segments without additional zero-padding, and the quantization steps may increase according to the TBS. According to embodiments, $TBS_{final}$ may be calculated according to Formula 3:

$$TBS_{final} = \left\lceil \frac{TBS_{temp}}{QS} \right\rceil \cdot QS - TB_{CRC}, \quad \text{[Formula 3]}$$

wherein QS is the quantization step, and $TB_{CRC}$ is the length of TB level CRC. According to embodiments, the ceiling operation in Formula 3 may be modified to any of a floor operation or a round operation. According to embodiments, $TB_{CRC}$ may be equal to 16 bits if $TBS_{final}$ is less than or equal to 3824, and otherwise, $TB_{CRC}$ may be equal to 24 bits. According to embodiments, TB CRC may be determined according to Formula 4:

$$TB_{CRC} = \begin{cases} 16, & TBS_{temp} \leq 3840 \\ 24, & TBS_{temp} > 3840 \end{cases}. \quad \text{[Formula 4]}$$

According to embodiments, the value of the quantization step QS may depend on the value of $TBS_{temp}$. For example, a larger $TBS_{temp}$ value may result in and/or be associated with a larger value of QS. According to embodiments, QS may be calculated according to the following options.

According to embodiments, QS may be calculated using a first option shown in Formula 5:

$$QS=8 \cdot C \quad \text{[Formula 5]},$$

wherein C is the number of CB segments for this TB. The value of C may depend on $TBS_{temp}$ and the code rate R from the MCS table. According to embodiments, the value of C may be determined according to Formula 6:

[Formula 6]

$$C = \begin{cases} 1, & \text{if}\left(R \leq \frac{1}{4} \ \& \ TBS_{temp} \leq 3840\right) \text{or}\left(R > \frac{1}{4} \ \& \ TBS_{temp} \leq 8448\right), \\ \left\lceil \frac{TBS_{temp}}{3816} \right\rceil, & \text{if } R \leq \frac{1}{4} \ \& TBS_{temp} > 3840, \\ \left\lceil \frac{TBD_{temp}}{8424} \right\rceil, & \text{if } R > \frac{1}{4} \ \& \ TBS_{temp} > 8448. \end{cases}$$

According to embodiments, $TBS_{final}$ may be determined by using (e.g., inserting, substituting) the results of Formulas 4 and 6 in Formula 3. According to embodiments, QS may be calculated using a second option shown in Formula 7:

$$QS=\text{lcm}(8,C) \quad \text{[Formula 7]},$$

wherein lcm(8, C) is the least common multiple of 8 and C, and C is calculated according to Formula 6.

According to embodiments, QS may be calculated using a third option: QS is a function of R and $TBS_{temp}$, wherein QS monotonically increases with $TBS_{temp}$ at a given R. According to embodiments, in a case having low code rates (for example, no more than ¼), BG2 may be used, and QS may be smaller than a QS used for BG1. A QS may be selected as a multiple of 8 so that a TBS maybe byte-aligned, e.g., in a subsequent operation. According to embodiments, a QS may have any size, one or more certain sizes, a range of sizes, etc. According to embodiments, there may be a case where a smallest QS size may be 8 bits, and/or a largest QS size may be 4096 bits or 8192 bits. According to embodiments, such a case may support a temporary TBS size of and/or up to 702240 bits, by setting, v=2, R=0.95, $Q_m$=8, $N_{RE}$=46200, wherein there are 3300 subcarriers and 14 symbol/slot.

According to embodiments, in a case where R>¼, QS may be determined according to Formula 8:

$$QS = \begin{cases} 8, & TBS_{temp} \leq 512 \\ 16, & 512 < TBS_{temp} \leq 1024 \\ 32, & 1024 < TBS_{temp} \leq 2048 \\ 64, & 2048 < TBS_{temp} \leq 4096 \\ 128, & 4096 < TBS_{temp} \leq 8192 \\ 256, & 8192 < TBS_{temp} \leq 16384 \\ 512, & 16384 < TBS_{temp} \leq 32768 \\ 1024, & 32768 < TBS_{temp} \leq 65536 \\ 2048, & 65536 < TBS_{temp} \leq 131072 \\ 4096, & TBS_{temp} > 131072 \end{cases} \quad \text{[Formula 8]}$$

and in a case where R≤¼' QS may be determined according to Formula 9:

$$QS = \begin{cases} 8, & TBS_{temp} \leq 256 \\ 16, & 256 < TBS_{temp} \leq 512 \\ 32, & 512 < TBS_{temp} \leq 1024 \\ 64, & 1024 < TBS_{temp} \leq 2048 \\ 128, & 2048 < TBS_{temp} \leq 4096 \\ 256, & 4096 < TBS_{temp} \leq 8192 \\ 512, & 8192 < TBS_{temp} \leq 16384 \\ 1024, & 16384 < TBS_{temp} \leq 32768 \\ 2048, & 32768 < TBS_{temp} \leq 65536 \\ 4096, & TBS_{temp} > 65536 \end{cases} \quad \text{[Formula 9]}$$

According to embodiments, in the above calculations, the $TBS_{temp}$ may include a TB level CRC. According to other embodiments using different calculations, there may be a case where $TBS_{temp}$ may not include a TB level CRC. In such a case, Formulas 3 and 6 may be respectively adjusted as shown below in Formulas 10 and 11:

$$TBS_{final} = \left\lceil \frac{TBS_{temp} - TB_{CRC}}{QS} \right\rceil \cdot QS - TB_{CRC}; \quad \text{[Formula 10]}$$

$$C = \begin{cases} 1, & \text{if}\left(R \leq \frac{1}{4} \; \& \; TBS_{temp} \leq 3824\right) \text{ or } \\ & \left(R > \frac{1}{4} \; \& \; TBS_{temp} \leq 8424\right), \\ \left\lceil \frac{TBS_{temp} + 24}{3816} \right\rceil, & \text{if } R \leq \frac{1}{4} \; \& TBS_{temp} > 3824, \\ \left\lceil \frac{TBD_{temp} + 24}{8424} \right\rceil, & \text{if } R > \frac{1}{4} \; \& TBS_{temp} > 8424. \end{cases} \quad \text{[Formula 11]}$$

In the above described calculations, there may be an error in a case of two conditions: (1) $TBS_{temp}$ is less (e.g., slightly less) than 3840, and (2) $TBS_{final}$ is above 3824. The first condition may result in $TB_{CRC}$=16 bits in Formula 4, and the second condition may result in $TB_{CRC}$=24 bits. According to embodiments, the resulting gap of 8 bits may be adjusted in $TBS_{final}$. For example, there may be the following adjustment shown in Formula 12:

If $TBS_{temp}$≤3840 and $TBS_{final}$>3824 according to Formula 3, then $TBS_{final}$=$TBS_{final}$−8  [Formula 12].

According to embodiments, there may be a case where, for any of BG1 or BG2, in order to reach a 1% or 10% block error rate (BLER) gap for different MCS levels, a signal to noise ratio (SNR) gap may vary according to and/or along with an information block size. For example, the SNR gap may be much larger between two adjacent MCSs (e.g., two neighboring MCS rows) in the MCS table when the information block size is small. Thus, according to embodiments, in a case where TBS is small, a look-up table may be applied to derive a TBS, for example, rather than using a formula. Using a look-up table to derive a TBS may ensure a similar spectrum efficiency gap between two neighboring TBSs.

According to embodiments, for a WTRU supporting only BG 1 or only BG 2, the TBS may be handled differently. For example, there may be a case where certain WTRUs (e.g., low-end WTRUs) support only one BG (either BG 1 or BG 2), which may be configured via RRC signaling. According to embodiments, in such a case, the TBS may be derived using the above described two-step procedure. For example, a first step to derive $TBS_{temp}$ may be the same as described above. In the calculation of $TBS_{final}$, Formulas 3 or 10 may be used. Further, according to embodiments, the quantization step QS may be obtained in a (e.g., slightly) different way than as described above.

According to embodiments, in a case where QS may be calculated using the first option shown in Formula 5, the value of C may depend on (e.g., may be determined according to) $TBS_{temp}$, the code rate R from MCS table, and which one of BG 1 or BG 2 is supported by a WTRU. According to embodiments, in a case where only BG 1 is supported, then C may be determined according to Formula 13:

$$C = \begin{cases} 1, & TBS_{temp} \leq 8448 \\ \left\lceil \frac{TBS_{temp}}{8424} \right\rceil, & TBS_{temp} > 8448 \end{cases}. \quad \text{[Formula 13]}$$

According to embodiments, $TBS_{final}$ may be determined by using (e.g., inserting, substituting) the results of Formulas 4 and 13 in Formula 3. According to embodiments, in a case where only BG 2 is supported, then C may be determined according to Formula 14:

$$C = \begin{cases} 1, & TBS_{temp} \leq 3840 \\ \left\lceil \frac{TBS_{temp}}{3816} \right\rceil, & TBS_{temp} > 3840 \end{cases}. \quad \text{[Formula 14]}$$

According to embodiments, $TBS_{final}$ may be determined by using (e.g., inserting, substituting) the results of Formulas 4 and 14 in Formula 3.

According to embodiments, in a case where QS may be calculated using the second option shown in Formula 7, the value of C may be calculated according to Formula 13 or 14 depending on which BG is supported by the WTRU. According to embodiments, in a case where QS may be calculated using the third option, QS may be a monotonically increasing function of $TBS_{temp}$. According to embodiments, in a case where only BG 1 is supported, then QS may be calculated using Formula 8 or a similar formula; and in a case where only BG2 is supported, then QS may be calculated using Formula 9 or a similar formula.

Figure 2:
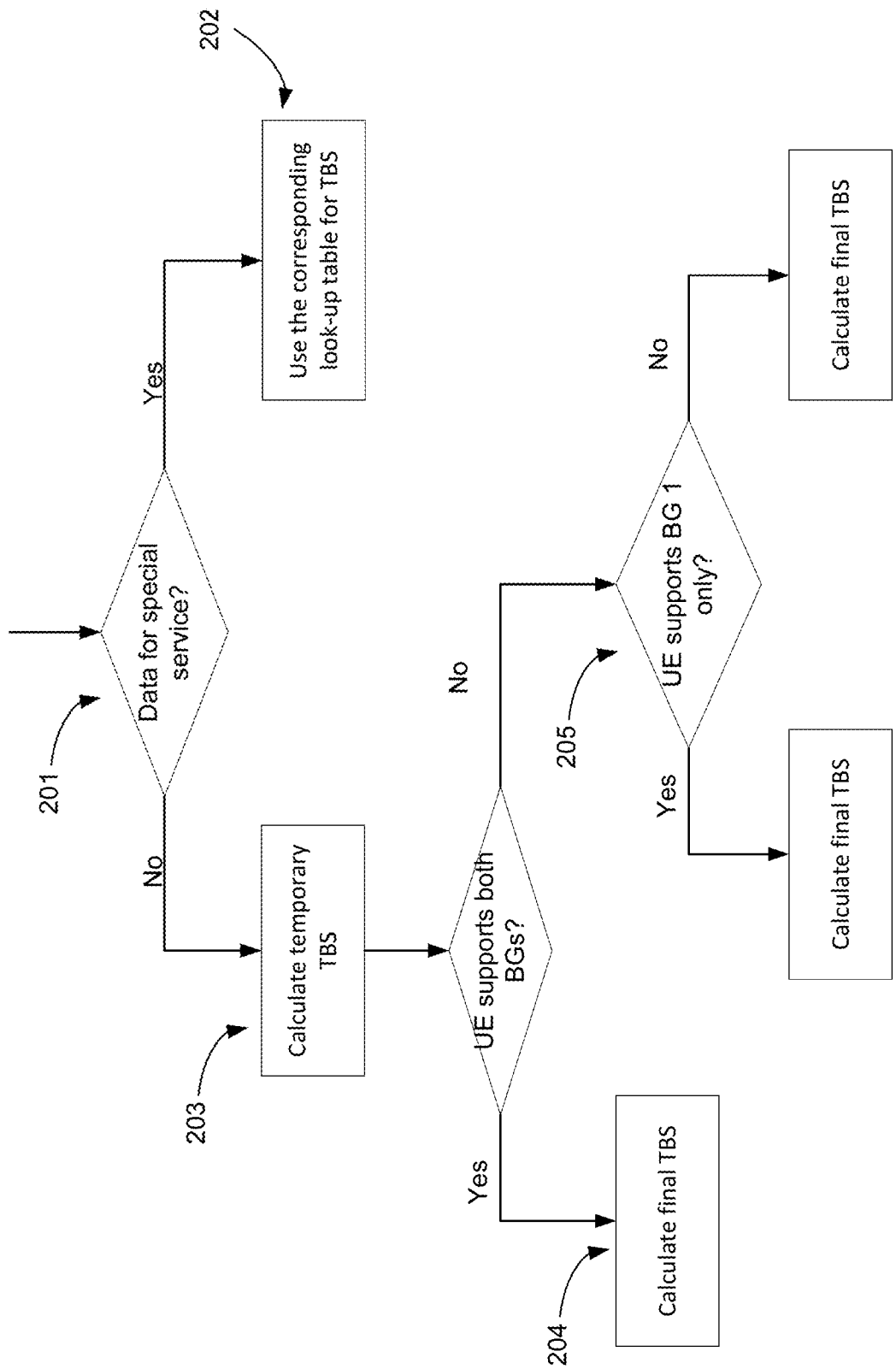
FIG. 2 is a diagram illustrating a TBS determination procedure according to embodiments.

FIG. 2 is a diagram illustrating a TBS determination procedure according to embodiments.

Referring to FIG. 2, operation 201 may be to determine a service associated with data. For example, for a certain data, operation 201 may be to determine if the data belongs to (e.g., is associated with, is for, etc.) one or more special services, such as VoIP or URLLC data. If the data belongs to and/or is for a special service, operation 202 may be to determine a TBS by applying a procedure different than the above discussed formula (e.g., a look-up table, or a different formula based procedure). Otherwise, in the case where the data does not belong to a special service, 203 operation may be to calculate the temporary TBS using a certain formula as described above. For example, if a WTRU supports both BGs, then operation 204 may be to apply the Formulas 3 or 10 to calculate the final TBS. As a further example, if a WTRU supports only a single BG, then operation 205 may be to apply a different calculation formula as described above (see Formulas 8, 9, 13, and 14).

LDPC Base Graph Selection Signaling

According to embodiments, LDPC base graph selection may depend on the code rate R of an initial transmission. For example, in a case where the code rate R is less than or equal to ¼, then BG2 may always be selected. Further, in a case where the code rate R is larger than ¼ and the TBS is larger than 292 bits (=308-16 bits), then BG2 may be used, for example, if the code rate R is less than ⅔. In a case where the code rate R is larger than ¼ and the TBS is smaller than 292 bits, then BG2 may always be used.

According to embodiments, the code rate R may be adjusted between the first transmission and subsequent transmissions. For example, the code rate R may be adjusted between the first transmission and a retransmission according to (e.g., depending on) the channel conditions. According to embodiments, there may be a case where a first transmission has a code rate less than ¼ and BG2 is used. In such a case, a receiver (e.g., a WTRU) may not receive a downlink control channel (e.g., the PDCCH) and may miss the first transmission. Further, in such a case, a transmitter (e.g., a gNB) may transmit a NACK. For example, a gNB may obtain a downlink transmission (DTX) opportunity in order to transmit a NACK associated with an error. For a retransmission, the transmitter may adjust the MCS value such that the code rate is larger than ¼. In such a case, since the WTRU may not receive the first PDCCH and may not be aware of the initial code rate, the WTRU may assume that BG1 is used (e.g., the WTRU may be configured to use BG1) based on the DCI information of the retransmission (e.g., R>¼). This may cause a mismatch between the respective BG selections of the transmitter and receiver.

According to embodiments, a BG may be indicated in DCI. For example, DCI may include information indicating a BG, such as a BG selected by a network. According to embodiments, DCI may include information indicating a BG selection decision, for example, according to the following options. According to embodiments, a BG selection decision may be explicitly indicated in DCI, for example, using an additional bit contained in DCI, specifying the BG selection. For example, a bit value of 0 may indicate that BG1 is used, while a bit value of 1 may indicate that BG2 is used. According to embodiments, a BG selection decision may be implicitly indicated in DCI, for example, the BG selection indication may be implicitly indicated by the bits of a MCS field in DCI.

In the case of an LTE deployment, for an initial transmission an MCS index may be selected from a range of 0 to 28, and a redundancy version (RV) may be set as 0. In the case of an LTE re-transmission, the MCS index may be selected from a range of 29 to 31. In such a case, there may be 5 bits in the DCI/UCI for the 32 possible values of the MCS index. Further, for a retransmitted PDSCH, the MCS index may be determined according to a modulation order, for example, rather than the RV. For a retransmitted PUSCH, the MCS index may be determined according to the RV, for example, rather than the modulation order.

According to embodiments, in the case of NR, for a retransmitted NR-PDSCH, 2 bits may be used (e.g., only 2 bits may be used) for the MCS index in DCI, wherein the MCS index may depend on the modulation order. According to embodiments, in the case where only 2 bits are used for indicating the MCS index, 3 bits in DCI field for the MCS index may be unused. That is, 3 bits from the MCS index in DCI may be saved. According to embodiments, 3 bits in the DCI, e.g., the saved 3 bits from the MCS index, may be used for the increased RVs. For example, the increased RVs may be used based on the assumption that the RV field for the initial transmission may be restricted to 2 bits. According to embodiments, the possible RVs for the initial transmission may be selected as any of 0, 1, 2, and 3.

According to embodiments, there may be a case of a first transmission having a MCS index of 10010 and a RV of 00. In such a case, the MCS index may be 18 and modulation order may be 6. According to embodiments, a re-transmission may have a MCS index of 10 and a RV of 00001. In such a case, the modulation order may be 6 and the RV may be 1. According to embodiments, a DCI payload size may be kept constant while a number of supported RVs may be increased. For example, in a case of performing dynamic switching of the MCS index field and RV field in DCI between initial transmissions and retransmissions, the DCI payload size may be kept constant, while the number of supported RVs may be increased from 4 (e.g., 2 bits) to 32 (e.g., 5 bits). According to embodiments, dynamic switching of the MCS index field in DCI between initial transmission and retransmission may support up to 32 RVs.

According to embodiments, in the case of NR, the number of supported RV may be less than 32. In such a case, 3 bits (e.g., the saved bits) of the MCS fields in retransmissions may be used for indicating CBG information. That is, according to embodiments, the saved bits may be used to indicate any of: an actual CBG number less than a configured CBG number, an actual CBG number indication, etc. According to embodiments, the features and operations described above with respect to DCI may be applied to uplink control information (UCI).

Code Book Group (CBG) Based HARQ

3GPP has discussed code block group (CBG) level Cyclic Redundancy Check (CRC), and has agreed that CBG-based transmission with single/multi-bit HARQ-ACK feedback may be supported in Release-15 (Rel-15), with the characteristics of: (1) only allow CBG based (re)-transmission for the same TB of a HARQ process; (2) a CBG can include all CB of a TB regardless of the size of the TB; (3) a CBG can include one CB; (4) CBG granularity is configurable.

In a case where a WTRU is configured with: (1) carrier aggregation, (2) adaptive timing K1, and (3) CBG based transmission, a HARQ-ACK payload may be large and may have variable sizes depending on the number of configured and/or scheduled PDSCH transmissions and CBG configurations. In such a case, a WTRU may need to feedback multiple sets of CBG HARQ-ACK in one PUCCH in one slot. Thus, there is a need for operations and methods that may efficiently perform HARQ-ACK transmission in the case of HARQ-ACK multiplexing and/or bundling for multiple TBs.

Further, in the case of NR, CBG is a newly adopted concept. According to embodiments, in the case of CBG based HARQ retransmission, a fractional part of a TB may be retransmitted to achieve better spectrum efficiency.

According to embodiments, TB level signaling and CBG level signaling may be used together for CBG based HARQ retransmission.

Efficient HARQ-ACK Codebook Design

According to embodiments, there may be a CBG based multi-step retransmission procedure. In a case of a good link adaptation scheme, a BLER (e.g., a target BLER) may be expected to be around 10%. In such a case further having a TB with up to 8 CBGs, a BLER may be higher, that is, the chance to have one or two CBGs in error may be higher. In another case, the entire TB may be lost, for example, due to change of channel. According to embodiments, there may be a retransmission scheme including retransmission of any of: (1) one or more CBGs, and (2) the entire TB. For example, such retransmission may reduce DCI and UL HARQ-ACK overhead in a DL case, and may reduce DCI and DL HARQ-ACK overhead in a UL case. According to embodiments, a retransmission size may be semi-static. For example, a retransmission size may be any of a TB size or one CBG size.

Figure 3:
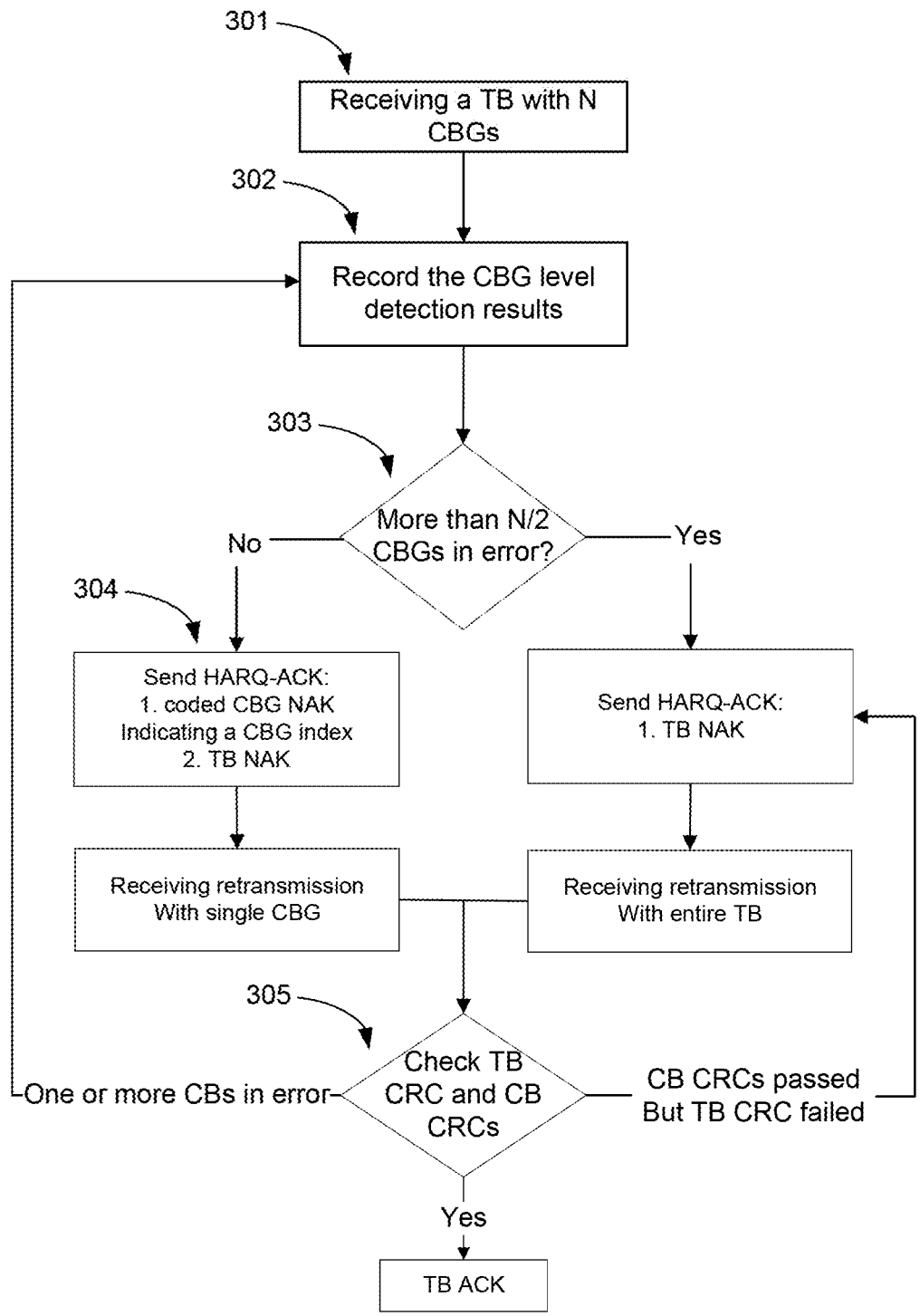
FIG. 3 is a diagram illustrating a method fora receiver according to embodiments.

FIG. 3 is a diagram illustrating a method for a receiver according to embodiments.

According to embodiments, a method may be performed by a receiver, for example, a WTRU receiving a DL transmission, as shown by the operations illustrated in FIG. 3. According to embodiments, at operation 301, a WTRU may receive a new transmission including a TB having N CBGs. At operation 302, a WTRU may decode a (e.g., each) CBG and may record (e.g., respective) CBG level detection results. According to embodiments, the record may have N bits and a bit may indicate whether a CBG may be decoded. For example, each of the N bits may indicate whether a certain (e.g., respective, corresponding, etc.) CBG may be decoded successfully.

At operation 303, a WTRU may determine the number of CBGs that have error(s) (e.g., CBGs received with errors, CBGs in error, etc.). According to embodiments, a WTRU may determine the number of CBGs in error according to a value, such as a threshold. For example, a WTRU may determine whether a minor or a major amount of CBGs are in error. According to embodiments, a WTRU may determine whether a minor or major amount of CBGs are in error by comparing number of corrupted CBGs with N/2.

According to embodiments, in a case where a major amount of CBGs are in error (e.g., the number of corrupted CBGs>N/2, or greater than any suitable value) a WTRU may send a HARQ-ACK using a TB level acknowledgement. According to embodiments, the HARQ-ACK may be an acknowledgement, such as a new type of acknowledgement, having a bit indicating (e.g., only indicating) whether a TB level acknowledgement is included. According to embodiments, the HARQ-ACK may be a fall back TB level acknowledgement, for example, a legacy TB level acknowledgement. According to embodiments, a TB level acknowledgement may be used to indicate (e.g., to configure, to command, to require, etc.) a TB level retransmission.

According to embodiments, in a case where a major amount of CBGs are in error (e.g., the number of corrupted CBGs>N/2, or greater than any suitable value), a WTRU may receive a retransmission having DCI indicating that a transmission (e.g., a current transmission) is a retransmission. For example, a DCI may indicate a retransmission by using a toggled new data indicator (NDI) or a fixed NDI, or any other similar and/or suitable type of signaling. According to embodiments, DCI may indicate that any of a part of a TB or an entire TB is retransmitted.

According to embodiments, at operation 304, in a case where a minor amount of CBGs are in error (e.g., the number of corrupted CBGs N/2, or less than any suitable value), a WTRU may send a HARQ-ACK using a CBG level acknowledgement. According to embodiments, the HARQ-ACK may be a new type of acknowledgement including a bit (e.g., one bit) indicating inclusion of any or both of a CBG level acknowledgement and a TB level acknowledgement. According to embodiments, the HARQ-ACK may be another new type of acknowledgement having a bit (e.g., one bit) indicating any or both of that a CBG level acknowledgement is included and that no TB level acknowledgement is included. According to embodiments, a WTRU may have, may be configured with, and/or may receive information, for example, using high level signals such as RRC signaling, indicating whether any or both of a CBG level acknowledgement and/or a TB level acknowledgement is included in an acknowledgement. For example, in a case where a WTRU is configured, via RRC signaling, with information indicating that a TB level acknowledgement is included in a HARQ-ACK, there may be no need for a bit included in the HARQ-ARQ to indicate such.

According to embodiments, a CBG level acknowledgement may be a coded acknowledgement, for example, rather than a bitmap. For example, a CBG index may be used to indicate that a corresponding CBG may be in error and/or that a retransmission may be required. According to embodiments a number of bits used for a CBG level HARQ-ACK may be fixed to a ceiling, for example, a ceiling of log $2(N_{MAX})$, wherein $N_{MAX}$ may be a configured (e.g., predefined, predetermined, signaled) number of CBGs, such as a maximum number of configured CBGs.

According to embodiments, a HARQ-ACK may indicate any number of CBGs that are in error. For example, a HARQ-ACK may indicate that the number of CBGs in error are more than 1. There may be a case where the number of configured CBGs is 8. According to embodiments, in a further case of a bitmap type of HARQ-ACK, 8 bits may be used to indicate the received CBG status. According to embodiments, in a case where the HARQ-ACK indicates that 1 or 2 CBGs are in error (e.g. only indicates that one or two CBGs have errors), three bits may be used to indicate a CBG having an error. For example, only 3 bits may be used per errored CBG. According to embodiments, in such a case, up to 6 bits may be used for the HARQ-ACK. According to embodiments, an additional bit (e.g. one bit) may be included to indicate whether the number of errored CBGs is 1 or 2.

According to embodiments, at operation 304, in a case where a minor amount of CBGs are in error (e.g., the number of corrupted CBGs N/2, or to any suitable value), a WTRU may receive a retransmission for which DCI may indicate that such is a retransmission. For example, a retransmission may be indicated by any of a toggled NDI, a fixed NDI, or other type of signaling. According to embodiments, DCI may indicate that a certain CBG is retransmitted. For example, DCI may indicate which CBG is retransmitted. According to embodiments, a CBG index may be used. According to embodiments, the number of bits for a CBG-level HARQ-ACK may be fixed to ceiling, for example, log $2(N_{MAX})$.

According to embodiments, at operation 305, for example, after reception of a retransmission, a receiver, e.g., a WTRU, may determine whether a TB is received correctly (e.g., without error) from a transmitter, such as a gNB. For example, a WTRU may determine whether a TB is successfully detected by checking one or more CRC for any of: (1)

one or more of the CBs, or (2) the TB CRC. According to embodiments, in a case where a TB is successfully detected, the receiver, e.g., the WTRU, may transmit a TB-level ACK to the transmitter, e.g., the gNB.

According to embodiments, in a case where one or more CBs is in error, a WTRU may update and record the CBG level detection results, and the WTRU may again perform (e.g., go to, return to, etc.) operation 303. According to embodiments, in a case where all (e.g., each) CB CRC passed, but a TB CRC failed, the WTRU may send a TB-level NAK, and the WTRU may determine whether a minor or major amount of CBGs are in error, as discussed above with respect to operation 303.

Figure 4:
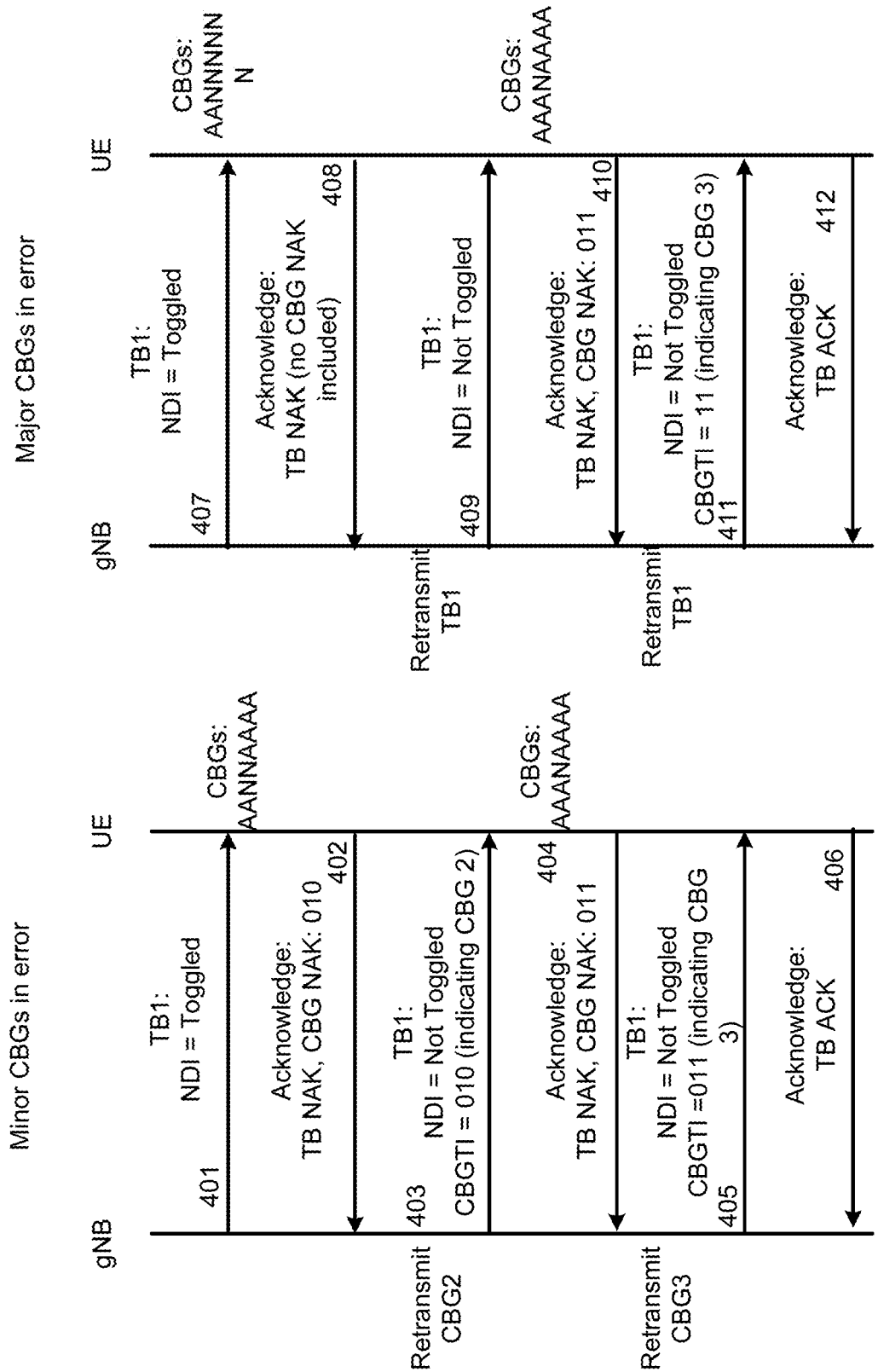
FIG. 4 is a diagram illustrating a CBG based multi-step retransmission according to embodiments.

FIG. 4 is a diagram illustrating a CBG based multi-step retransmission according to embodiments.

According to embodiments, there may be a retransmission scheme including CBG level ACKs/NACKs for a receiver, e.g. a WTRU, and a transmitter, e.g., a gNB, as illustrated in FIG. 4.

Referring to FIG. 4, a TB may have 8 CBGs. According to embodiments, a first transmission 401 from the gNB may include DCI indicating that this (e.g., the first transmission) may be a new TB, for example, using a NDI or other signaling(s). According to embodiments the gNB may transmit the TB, for example, after transmitting the DCI.

According to embodiments, a WTRU may determine that a minor number of CBGs are in error. For example, according to embodiments, there may be a case where a WTRU detects that less than 4 CBGs are received in error, and the WTRU may record its CBG level acknowledgements. For example, the WTRU may store, save, record, etc. information associated and/or indicating which CBGs have errors and which CBGs are correctly detected and/or received. In such a case, the WTRU may have (e.g., may record) a CBG level acknowledgement bitmap of [AANNAAAA], which indicates that CBGs 2 and 3 are in error from among CBGs 0-7 (for example, the letter "A" represents an ACK, and the letter "N" represents a NACK). According to embodiments, the WTRU may send an acknowledgement 402 including any of a CBG level coded acknowledgement and a TB level acknowledgement. According to embodiments, a CBG level acknowledgement may be encoded to included information indicating a CBG index, for example, instead of including a bitmap indicating CBGs. According to embodiments, a TB level acknowledgement may be optional.

According to embodiments, the CBG level acknowledgement may be (e.g., encoded using) 3 bits to indicate which CBG may be (e.g., commanded to be, required to be, etc.) retransmitted. For example, a CBG coded ACK of '010' may indicate that CBG 2 is to be retransmitted. According to embodiments, the gNB may retransmit CBG 2 403 (e.g., only retransmit CBG 2) and may set DCI to indicate a retransmission. For example, a CBG transmit indication (CBGTI) may be '010', which may indicate that the retransmission includes CBG 2. According to embodiments, the WTRU may receive (e.g., correctly receive) the retransmitted CBG 2, and may update its recorded CBG level acknowledgement bitmap from [AANNAAAA] to [AAANAAAA]. According to embodiments, the WTRU may send (e.g., another) acknowledgement 404 to the gNB to request retransmission of CBG 3. According to embodiments, the gNB may retransmit CBG 3 405 with DCI indicating a retransmission and with a CBGTI of '011', for example, to indicate that the retransmission carries CBG 3. According to embodiments, the WTRU may detect (e.g., successfully detect) CBG 3 and may update the record of (e.g., the WTRU's recorded) CBG level acknowledgement bitmap from [AAANAAAA] to [AAAAAAAA]. According to embodiments, the WTRU may determine (e.g., check) the TB level CRC, and if all CRCs passed, the WTRU may send an TB level acknowledgement 406 to the gNB.

According to embodiments, the WTRU may determine that a major number of CBGs are in error. For example, there may be a case where the WTRU detects more than 4 CBGs are in error. According to embodiments, the WTRU may record (e.g., store) its CBG level acknowledgements. For example, referring to FIG. 4, after gNB transmission 407, the WTRU may have (e.g., may record) a CBG level acknowledgement bitmap of [AANNNNNN], which indicates that CBG 0 and 1 are detected (e.g., successfully detected) and that the rest of the CBGs (CBG 2 through CBG 7) are in error. According to embodiments, the WTRU may send a TB level acknowledgement 408 to request a TB level retransmission. According to embodiments, the gNB may retransmit the TB 409 (e.g., the entire TB) and may set DCI to indicate that the TB is for a retransmission. According to embodiments, there may be a case where the WTRU receives the retransmitted TB in which (e.g., only) CBG 3 is in error. In such a case, the WTRU may update its recorded CBG level acknowledgement bitmap from [AANNNNNN] to [AAANAAAA]. In this case, the WTRU may determine that a minor number of CBGs are in error and may request retransmission of single CBG. According to embodiments, the WTRU may send (e.g., another) acknowledgement 410 to the gNB to request retransmission of CBG 3. According to embodiments, the gNB may retransmit CBG 3 411 with DCI information indicating a retransmission and with a CBGTI of '011', for example, to indicate that the retransmission is for (e.g., carries) CBG 3. According to embodiments, the WTRU may detect CBG 3 and may update its recorded CBG level acknowledgement bitmap from [AAANAAAA] to [AAAAAAAA]. According to embodiments, the WTRU may determine the TB level CRC, and if all CRCs passed, the WTRU may send a TB level acknowledgement 412 to the gNB.

Base Graph Dependent CBG Grouping

According to embodiments, in the case of NR LDPC design, a LDPC parity check matrix may be selected from among two LDPC base graphs (BGs). According to embodiments, a LDPC code block size may be variable, for example, based on a BG selection procedure. There may be a case where the LDPC CB size of BG 1 is larger than the LDPC CB size of BG 2. Further, a number of scheduled CBGs may impact both or any of DL and UL signaling, for example, when a dynamic HARQ-ACK codebook is used. According to embodiments, a CBG grouping procedure may (e.g., need to) consider the BG selection, or in other words, may depend on the BG selection procedure. According to embodiments, with a BG dependent CBG grouping procedure, CBGs with BG 1 may contain more CBs than the CBGs with BG 2.

Figure 5:
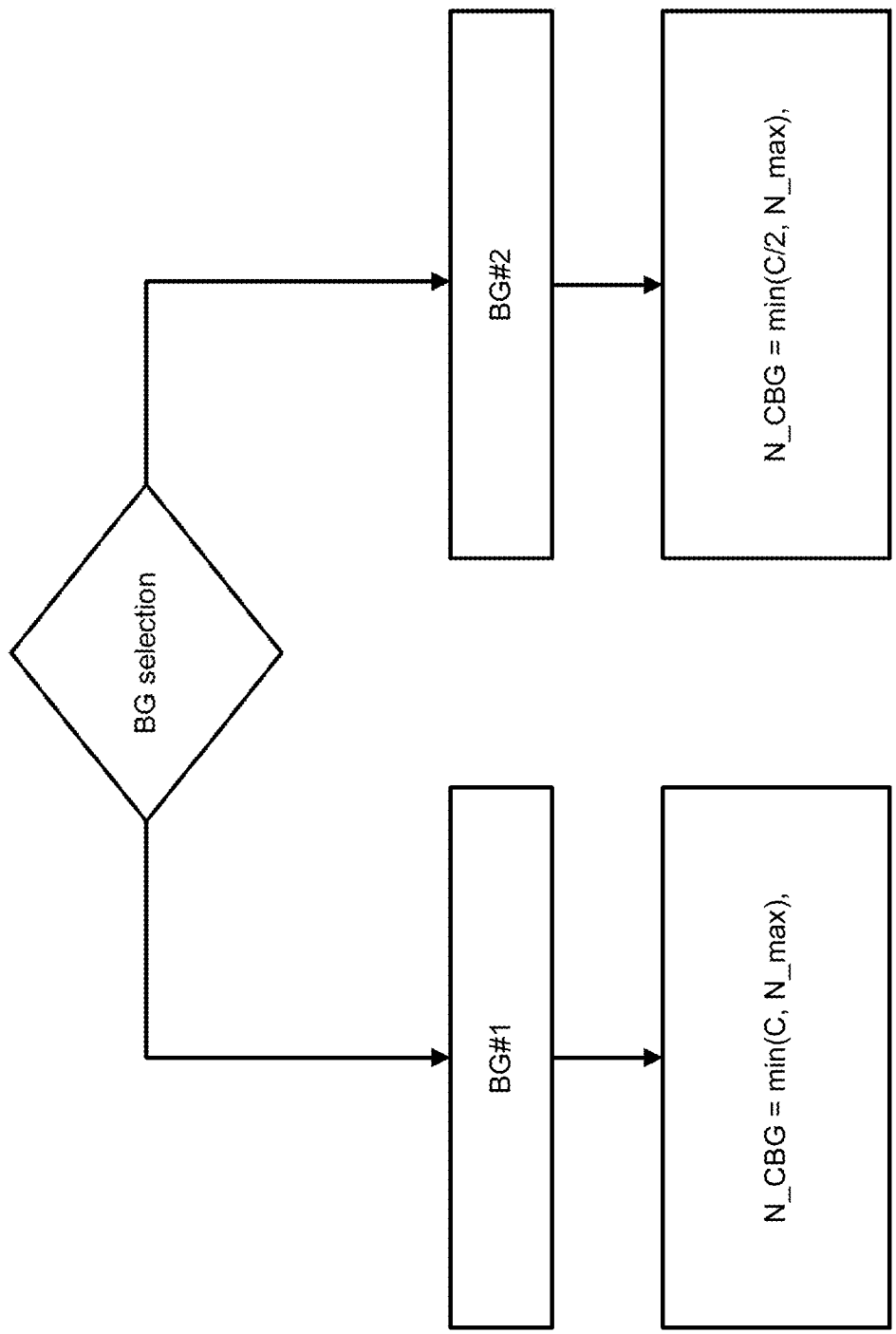
FIG. 5 is a diagram illustrating BG dependent CBG grouping according to embodiments.

FIG. 5 is a diagram illustrating BG dependent CBG grouping according to embodiments. A TB may have a number of CBs, for example, a number of C. According to embodiments, a WTRU may determine that the BG to be used is signaled in DCI and/or is determined by an LDPC encoding procedure. According to embodiments, in a case where BG 1 is used, the WTRU may determine a number of CBGs according to Formula 15:

$$N_{HARQ-ACK}^{CBG/TB} = \min(N_{HARQ-ACK}^{CBG/TB,max}, C) \quad \text{[Formula 15]},$$

wherein $N_{HARQ-ACK}^{CBG/TB,max}$ may be the maximum number of CBGs for generating HARQ-ACK information bits for a TB reception when the PDSCH includes one or two transport blocks.

According to embodiments, in a case where BG 2 is used, the WTRU may determine a lesser number of CBGs than the number of CBGs for the BG 1 scenario. According to embodiments, in the case where BG 2 is used, the number of CBGs may be determined according to Formula 16:

$$N_{HARQ-ACK}^{CBG/TB} = \min(N_{HARQ-ACK}^{CBG/TB,max}, f(C)) \quad \text{[Formula 16]},$$

wherein $f(C)=C/2$, or $f(C)=\lfloor C/2 \rfloor$, or $f(C)=\lceil C/2 \rceil$ or $f(C)=\text{round}(C/2)$, and wherein, the $f()$ function may be modified with other functions.

HARQ-ACK Codebook Design

In some cases, a single PUCCH or PDCCH may carry HARQ-ACKs for multiple transport blocks. According to embodiments, to reduce HARQ-ACK feedback overhead, while maintaining (e.g., certain) transmission reliability, multiple HARQ-ACK codebook schemes may be supported and configurable. According to embodiments, HARQ-ACK codebook scheme selection may be performed and signaled using higher layer signaling, such as RRC signaling. According to embodiments, codebook scheme selection may be performed at a per transmission basis or level, and signaling may be carried in control signaling, such as DCI and/or UCI etc. According to embodiments, the selection may be implementation based or otherwise specified. According to embodiments, the selection of a codebook scheme may be made according to certain criteria, for example, short term statistics of a channel, long term statistics of a channel, co-channel interference, interference from other cells, etc.

According to embodiments, a traffic type may be considered or used when performing HARQ-ACK codebook selection. For example, a traffic type with a low delay/jitter requirement may use a HARQ-ACK codebook with a high compression ratio. According to embodiments, in a case where a HARQ-ACK codebook may not be sufficient due to a high compression ratio, a transmitter may perform a retransmission in a certain way. For example, the transmitter may perform a retransmission in conservative way by retransmitting all the CBGs which may be in error. In such a case, retransmission overhead may be heavy but control overhead may be small. According to embodiments, traffic with a high delay/jitter requirement may use a HARQ-ACK codebook with low compression ratio. According to embodiments, in such a case, a HARQ-ACK codebook may carry accurate HARQ-ACK information at a CBG level, and the transmitter may retransmit one or more corrupted CBGs. In such a case, for example, retransmission overhead may be small while control overhead (e.g., UCI and/or DCI) may be large. According to embodiments, a compression ratio of a HARQ-ACK codebook may be defined as shown in Formula 17:

$$R_{comp}^{HARQ-ACK} = \frac{N_{HARQ-ACK} - N_{coded}}{N_{HARQ-ACK}}, \quad \text{[Formula 17]}$$

wherein $N_{HARQ-ACK}$ is the total number of uncoded/uncompressed HARQ-ACK bits to be carried in a single UCI or DCI. According to embodiments, in a case where UCI or DCI includes HARQ-ACKs for K TBs and each TB may have M CBGs, then the $N_{HARQ-ACK}=MK$. $N_{coded}$ is the number of bits carried in UCI or DCI. According to embodiments, normally, $N_{coded} \leq N_{HARQ-ACK}$.

According to embodiments, two HARQ-ACK codebook schemes may be configured (e.g., predefined). According to embodiments, signaling, including any of higher layer signaling or per transmission based signaling, may be used to indicate which codebook scheme may be used. According to embodiments, a first option may be to use full size feedback with CBG level HARQ-ACKs, with or without including TB level HARQ-ACKs. According to embodiments, with the first option, large HARQ-ACK signaling overhead may be needed (e.g., required), however, CBG level efficient retransmission may be achieved. According to embodiments, a second option may be to use TB level HARQ-ACK with a TB bundled CBG HARQ-ACK. According to embodiments, with the second option, limited and fixed size HARQ-ACK overhead may be utilized, however, retransmission may carry un-necessary CBGs. According to embodiments, the second option may be for a case having periodical UL transmissions, where the same physical resources are used for all the TBs and may also be for a case having a large number of CBGs per TB.

FIG. 6 is a diagram illustrating a HARQ-ACK codebook design according to embodiments.

FIG. 6 shows a HARQ-ACK codebook design based on an encoding procedure of the second option discussed above. According to embodiments, a device (e.g., a receiver, a WTRU, a transmitter, a gNB) may transmit (e.g., feedback) HARQ-ACK information for 4 TBs in one UCI or DCI, wherein maximum number of CBGs per TB may be 8. The table of FIG. 6 illustrates the decoding results for each CBG of a TB. According to embodiments, a shaded part of the table may be recorded directly based on the decoding results. According to embodiments, a value of 1 may indicate that the $CBG_i$ in $TB_j$ is correctly decoded or may indicate that nothing is transmitted on that CBG, while a value of 0 may indicate that the $CBG_i$ in $TB_j$ is not correctly decoded. Here we have $i \in \{0, 1, \ldots, 7\}$ and $j \in \{0, \ldots, 3\}$, which may indicate that CBG 5 in TB 1 and CBG 3 in TB 3 have errors. According to embodiments, based on such information, the device may derive any of: (1) TB HARQ-ACK: if all of the CBGs in the TB (row wise in the table) are correctly decoded and TB CRC is passed, the TB HARQ-ACK bit may be set to 1, otherwise it may be set to 0; and (2) TB bundled CBG HARQ-ACK: for each column in the table, an AND operation may be applied. In other words, for column i, if $CBG_i$ for TB0 to TB3 are correctly decoded with value 1, then the TB bundled CBG HARQ-ACK bit i may be set to 1, otherwise it may be set to 0.

According to embodiments, in the UCI or DCI, only TB HARQ-ACK bits and TB bundled CBG HARQ-ACK bits may be feedback. According to embodiments, a device which receives the HARQ-ACK codebook may determine the retransmission accordingly. For example, such a device may determine (e.g., check) the TB HARQ-ACK bits and may locate the values of 0. As shown in FIG. 6, TB 1 and TB 3 have a 0 for the TB HARQ-ACK. In such a case, the device may determine (e.g., check) TB bundled CBG HARQ-ACK bits and may locate the CBGs with value 0. As shown in FIG. 6, CBG 3 and CBG 5 have values of 0. According to embodiments, the device may retransmit CBG 3 and CBG 5 for TB 1 and TB 3. According to embodiments, four corrupted CBGs may be retransmitted. According to embodiments, other variations of codebook design may be developed based on the above discussed concepts.

According to embodiments, a group based bundling mechanism may be used. For example, with reference to FIG. 6, TB 0 to TB 3 may be bundled together to derive TB bundled CBG HARQ-ACK bits. According to embodiments, group based bundling mechanisms may be used, for example, based on any of: channel assignment, interference condition, spatial multiplexing condition, and traffic types. According to embodiments, a group based bundling mechanism may request additional signaling to indicate the group. For example, for DL transmission, a HARQ-ACK group index may be included in DCI that carries DL control information. According to embodiments, a HARQ-ACK group index may be included in UCI that carries uplink acknowledgement.

According to embodiments, a DL procedure may be performed according to the following operations. According to embodiments, a WTRU may receive a DL data transmission with one or more code words (CWs). According to embodiments, each CW may have any of the following control information: (1) a HARQ-ACK group index, for example, this index may indicate which HARQ-ACK group the TB or CW belongs to; (2) a counter downlink assignment indicator (DAI), which may also be referred to as a countdown (CD) DAI, or CD_DAI, and for example, this field may indicate the accumulative number of PDSCH receptions in the HARQ-ACK group; or (3) a total DAI, for example, this field may indicate the total number of PDSCHs in the HARQ-ACK group.

According to embodiments, a WTRU may decode the CW and keep (e.g., record, store, etc.) the CBG level decoding results (for example, if CBG base transmission may be supported) with respect to a corresponding HARQ-ACK group. According to embodiments, a WTRU may determine whether the counter DAI in the HARQ-ACK group is equal to the total DAI for the group (or equal to total DAI-1, if the counter DAI starts from 0). According to embodiments, in a case where the WTRU does not receive any valid data transmission during a predefined or predetermined maximum monitoring period, the WTRU may prepare an acknowledgement for the HARQ-ACK group.

According to embodiments, a WTRU may determine whether an option 1 codebook or an option 2 codebook is used by checking any of higher layer signaling or per transmission signaling. In the case of the option 2 codebook, the WTRU may derive TB HARQ-ACK bits and TB bundled CBG HARQ-ACK bits based on the decoding results recorded for the HARQ-ACK group. According to embodiments, a PUCCH may carry the HARQ-ACK codebook and a HARQ-ACK group indication may be included. According to embodiments, with this procedure, the counter DAI and total DAI may be defined for each HARQ-ACK group and further. According to embodiments, the total DAIs for different HARQ-ACK groups may be different.

Figure 7:
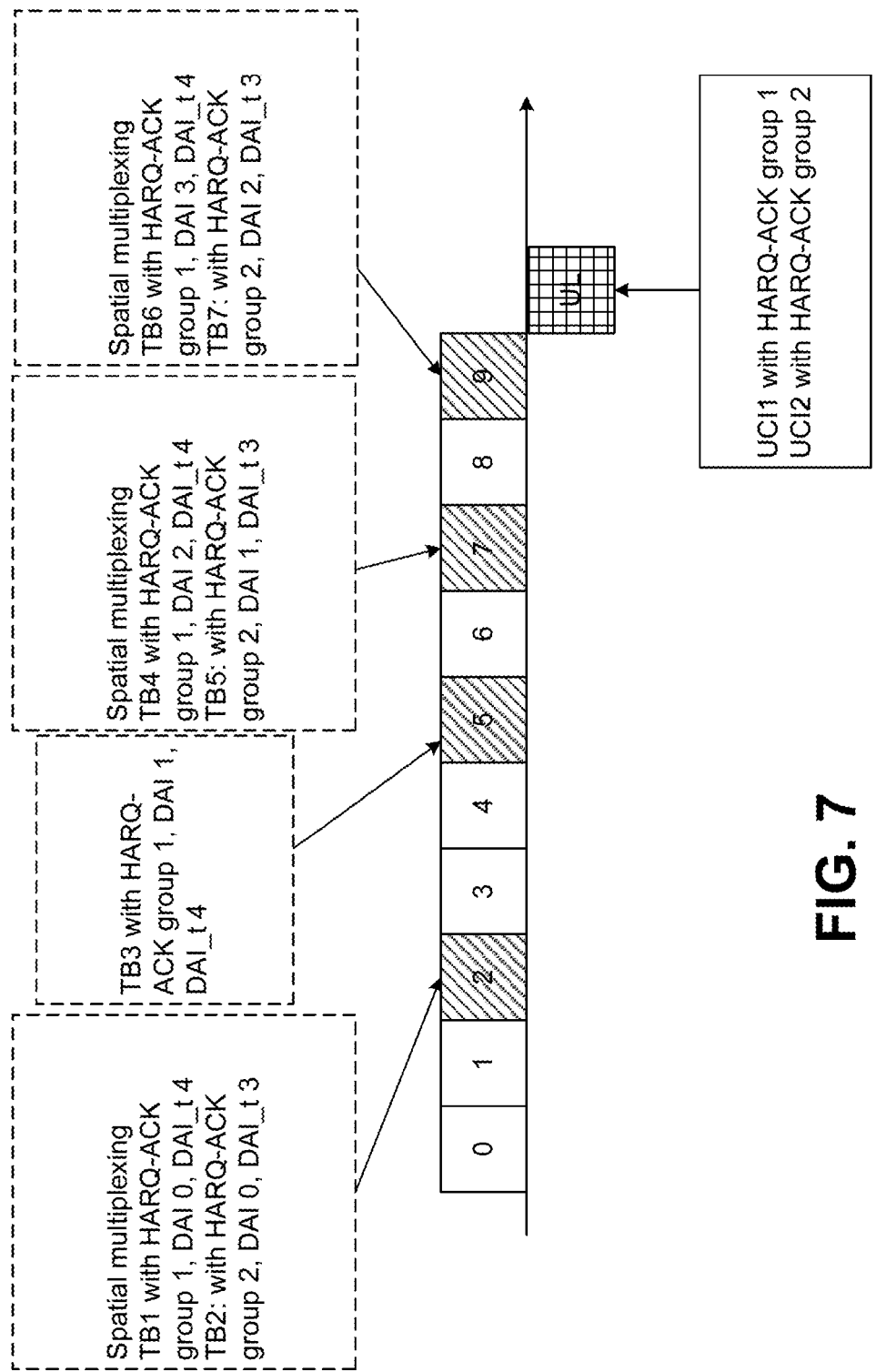
FIG. 7 is a diagram illustrating HARQ-ACK codebook compression according to embodiments.

FIG. 7 is a diagram illustrating a group based HARQ-ACK codebook procedure according to embodiments.

As illustrated in FIG. 7, two HARQ-ACK groups may be used. According to embodiments, a first DL transmission associated with a WTRU may be in slot 2 with two CWs. For the first CW, TB 1 may be transmitted, a HARQ-ACK group index may be set to 1, a counter DAI may be set to 0, and a total DAI may be set to 4. For the second CW, TB 2 may be transmitted, a HARQ-ACK group index may be set to 2 (for example, to indicate that the two spatial streams belong to different HARQ-ACK groups), a counter DAI may be set to 0, and a total DAI may be set to 3. However, the present disclosure is not limited there to, and a total DAI may be set to different number with and/or for a different HARQ-ACK group. In slot 5, TB 3 may be transmitted with a HARQ-ACK group index set to 1, a counter DAI set to 1, and a total DAI set to 4. In slot 7, TB 4 may be transmitted with a HARQ-ACK group index set to 1, a counter DAI set to 2, and a total DAI set to 4. In the same slot, TB 5 may be transmitted with a HARQ-ACK group index of 2, a counter DAI of 1, and a total DAI of 3. In slot 9, TB 6 may be transmitted with a HARQ-ACK group index of 1, a counter DAI of 3, and a total DAI of 4. In the same slot, TB 7 may be transmitted with a HARQ-ACK group index of 2, a counter DAI of 2, and a total DAI of 3.

According to embodiments, the WTRU may transmit an uplink acknowledgement in a configured (e.g., scheduled, pre-scheduled, pre-determined, etc.) uplink slot. According to embodiments, in the uplink slot, the HARQ-ACK codebooks for HARQ-ACK group 1 and 2 may be included. According to embodiments, HARQ-ACK group indices may be carried explicitly. According to embodiments, the HARQ-ACK codebooks for HARQ-ACK group 1 and 2 may be carried in separate uplink slots. According to embodiments, a HARQ-ACK group index may be implicitly signaled. For example, the HARQ-ACK group index may be signaled using a process ID and/or any other similar information. According to embodiments, HARQ-ACK grouping may be determined according to implementation, e.g., designer implementation.

According to embodiments, certain criteria may be applied to a HARQ-ACK grouping implementation. For example, there may be a case having a same or similar resource allocations for data transmission. According to embodiments, in such a case, a HARQ-ACK group may be across multiple slots, for example, because slots with similar frequency resources may experience highly correlated channels. According to embodiments, in the case of multi-spatial stream transmission with more than one CW, each CW may or may not experience similar or correlated channels. In such a case, the two CWs may or may not belong to one HARQ-ACK, for example, according to designer implementation.

Dynamic HARQ-ACK Codebook with Countdown Indicator

Figure 8:
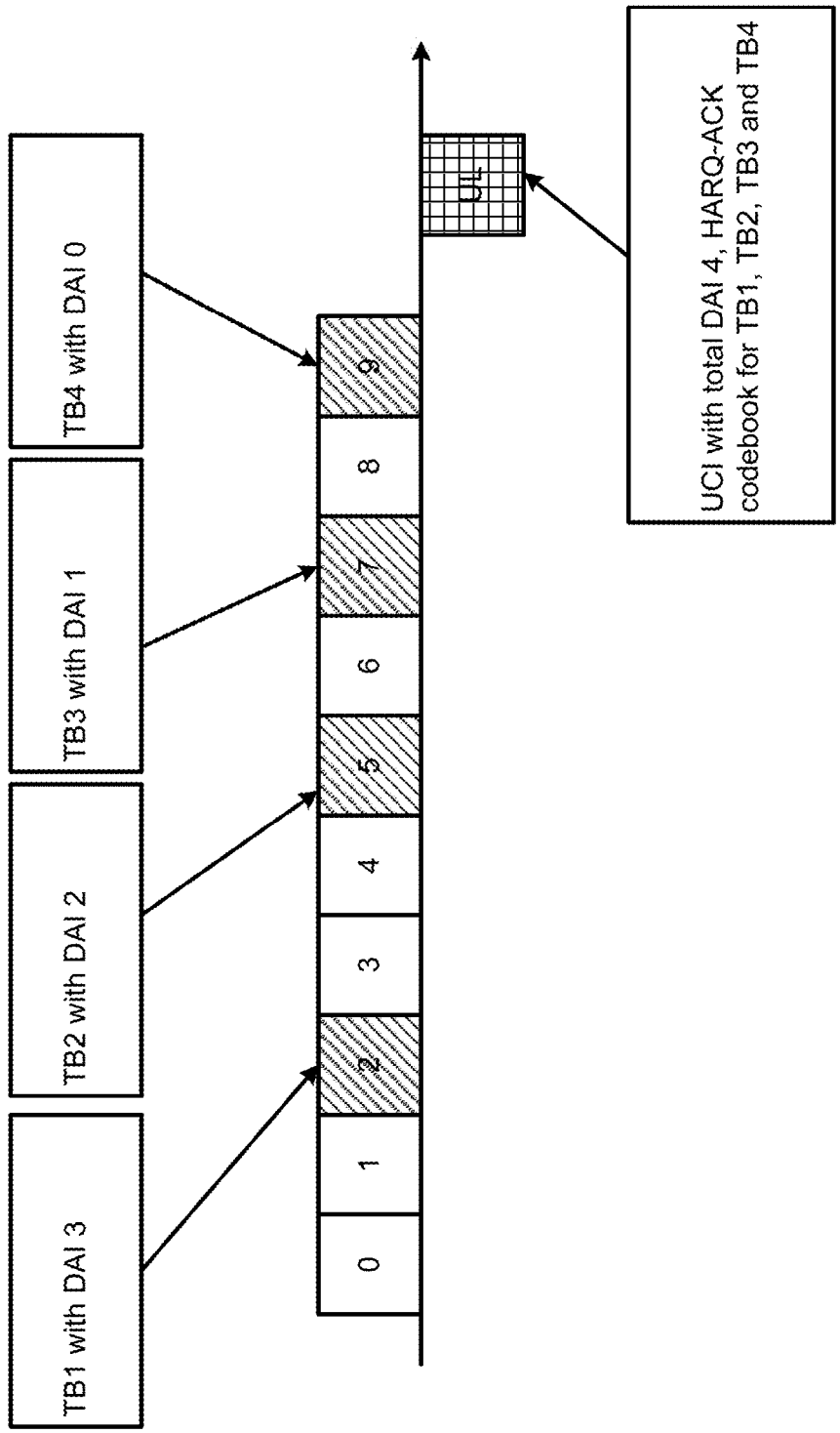
FIG. 8 is a diagram illustrating a retransmission method according to embodiments.

FIG. 8 is a diagram illustrating a HARQ-ACK codebook with a countdown DAI according to embodiments.

According to embodiments, a countdown DAI (which may also be referred to as a counter DAI) may be used for HARQ-ACK codebook signaling of a DL procedure, as shown in FIG. 8. According to embodiments, a WTRU may receive a DL data transmission with one or more code words (CWs). According to embodiments, each CW may have control information including a countdown DAI for indicating the number of additional PDSCHs expected after this PDSCH. According to embodiments, the WTRU may decode the CW and keep the CBG level decoding results, for example, in a case where CBG base transmission may be supported. According to embodiments, in a case where the countdown DAI reaches to 0 or a time period (e.g., a predefined, predetermined, maximum, etc., time for monitoring) is reached or expires, the WTRU may prepare the acknowledgement for the saved PDSCHs.

According to embodiments, a total DAI indication may be included to signal the number of TBs and/or PDSCHs the HARQ-ACK codebook may carry. For example, the total DAI indication may be included in the PUCCH which may carry the HARQ-ACK codebook. According to embodiments, in a case where the first several TBs and corresponding PDCCHs are missing, the WTRU may include a total DAI less than the real transmitted PDCCHs/TBs. In such a case, the gNB may know and/or determine that the first several TBs/PDCCHs and corresponding DCIs were lost (e.g., were in error).

HARQ-ACK Codebook Design

Any of CBG level retransmission or multi-transport block (TB) aggregated HARQ-ACK feedback may be supported. However, in the case of supporting CBG level retransmission or multi-TB aggregated HARQ-ACK feedback, a HARQ-ACK feedback payload may be large. For example, a single HARQ-ACK feedback may include acknowledgement for M TBs, and each TB may have up to N CBGs. In a case where the HARQ-ACK feedback provides (e.g., indicates, carries, includes, etc.) acknowledgements using a bitmap, which may also be referred to as any of a vector or a codebook, that is not compressed, the bitmap may include M×N bits to provide the HARQ-ACK feedback for the M TBs and the N CBGs. In such a case, for the $m^{th}$ TB, the HARQ-ACK bitmap may be denoted as a vector $A_m = [a_{m1} \ldots a_{mN}]^T$, $m=1, \ldots, M$, and each component $a_{mn}$ may indicate whether the $n^{th}$ CBG in $m^{th}$ TB is correctly decoded.

For example, in a case where the CBG is correctly decoded, then $a_{kn}=1$, or in other words, $a_{kn}$ may be set equal to 1. In the case where the CBG is not correctly decoded, then $a_{kn}=0$, or in other words, $a_{kn}$ may be set to 0. In a case where a CBG may not be transmitted, then the corresponding bit may be set to 1. For example, in a case where less than the maximum number of CBGs per TB is used, the bitmap may still include 1s for the CBGs not transmitted. That is, even in the case of using less than the maximum number of CBGs, the bitmap indicating the HARQ-ACK feedback may be large having a size of M×N bits.

Figure 9:
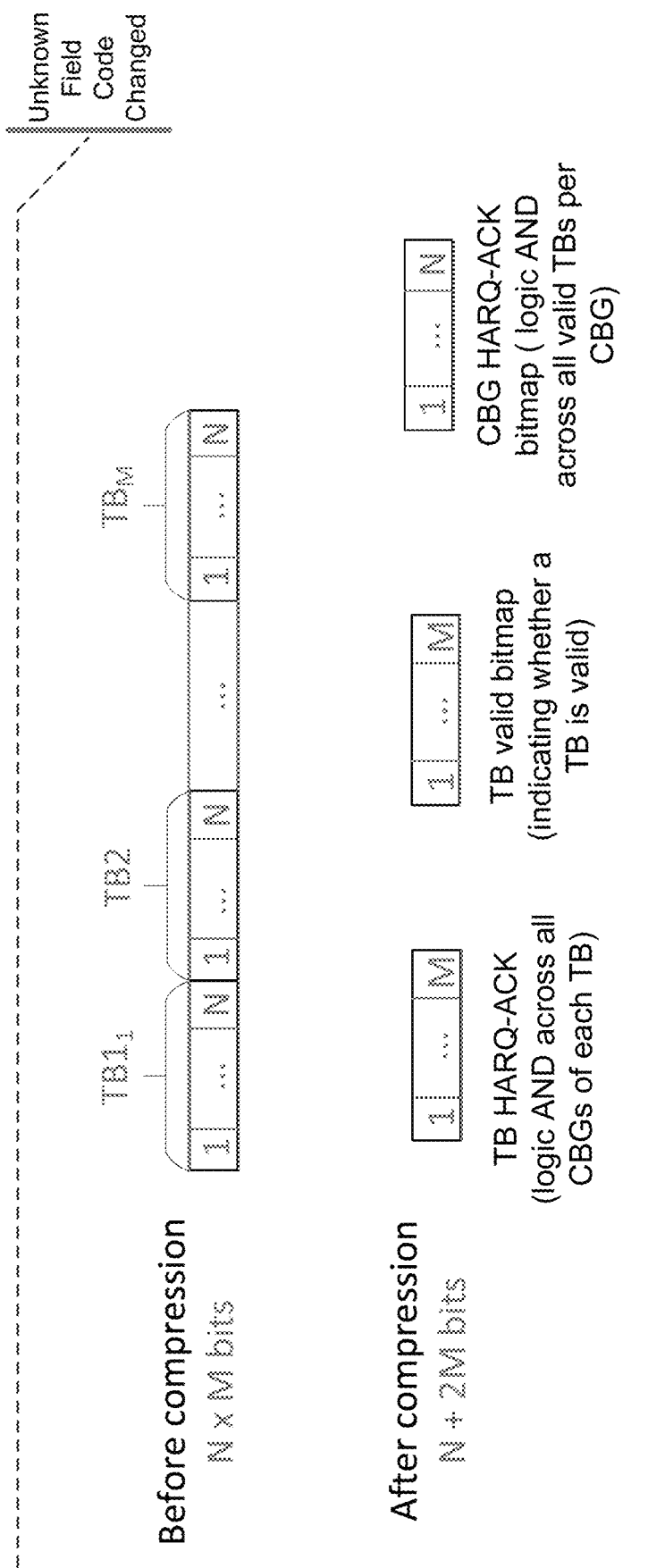
FIG. 9 is a diagram illustrating a retransmission method according to embodiments.

FIG. 9 is a diagram illustrating HARQ-ACK codebook compression according to embodiments.

Referring to FIG. 9, a CBG based HARQ-ACK codebook compression method may use (e.g., may need) N+2M bits for HARQ-ACK feedback. According to embodiments, three vectors may be as HARQ-ACK feedback, and may include any of a TB HARQ-ACK bitmap, a TB valid bitmap, or a CBG HARQ-ACK bitmap.

According to embodiments, a first vector may be denoted as C1, may have a size M, and may be a TB HARQ-ACK bitmap. According to embodiments, the $m^{th}$ bit in the TB HARQ-ACK bitmap may indicate whether the $m^{th}$ TB is correctly decoded. For example, $C1_m=1$ if all the CBGs in $m^{th}$ TB are correctly decoded and a TB level CRC is passed; and otherwise, $C1_m=0$ if any number of the CBGs in $m^{th}$ TB are not correctly decoded or the TB level CRC is failed.

According to embodiments, a second vector may be denoted as C2, may have a size M, and may be a TB valid bitmap. According to embodiments, the $m^{th}$ bit in the TB valid bitmap may indicate whether the $m^{th}$ TB is valid. For example, $C2_m$ may be set to 1 (e.g., $C2_m=1$) if one or more CBG in the TB is correctly decoded. As a further example, in a case where all CBGs are not received correctly, $C2_m$ may be set to 0 (e.g., $C2_m=0$). According to embodiments, a valid TB may be defined according to the following equation $TB_{Valid}=\{TB_m|C2_m=1\}$.

According to embodiments, a third vector may be denoted as C3, may have a size N, and may be a CBG HARQ-ACK bitmap. According to embodiments, the $n^{th}$ bit in the CBG HARQ-ACK bitmap may indicate whether the $n^{th}$ CBG in all valid TBs are correctly decoded. For example, $C3_n$ may be set to 1 (e.g., $C3_n=1$) if (e.g., only if) the $n^{th}$ CBGs in all valid TBs are correctly decoded. According to embodiments, the vector C3 may be calculated using a logic AND operation across all valid TBs per CBG.

According to embodiments, a retransmission method may include a compressed HARQ-ACK codebook. According to embodiments, the three vectors C1, C2, and C3 may be received, for example, by a WTRU. According to embodiments, a set of TBs with $TB=\{TB_m|C1_m=1\}$ may be saved (e.g., stored, written to memory) and the TBs may be considered as correctly received. According to embodiments, the set of TBs with $TB=\{TB_m|C2_m=0\}$ may be retransmitted and all the CBGs in the TBs may be considered as not correctly received. According to embodiments, all CBGs satisfying $\{CBG_{mn}|C1_m=0 \text{ and } C3_n=0\}$ may be retransmitted.

According to embodiments, in the case of the retransmission method described above, the number of CBGs that are retransmitted may be slightly larger than the number of CBGs that are (e.g., received) in error. According to embodiments, base graph dependent CBG grouping (as discussed above) may be used in combination with the retransmission method described above, and for example, CBGs in each TB may experience similar or correlated channel condition. In such a case, the number of (e.g., unnecessary) retransmissions may be further reduced.

Figure 10:
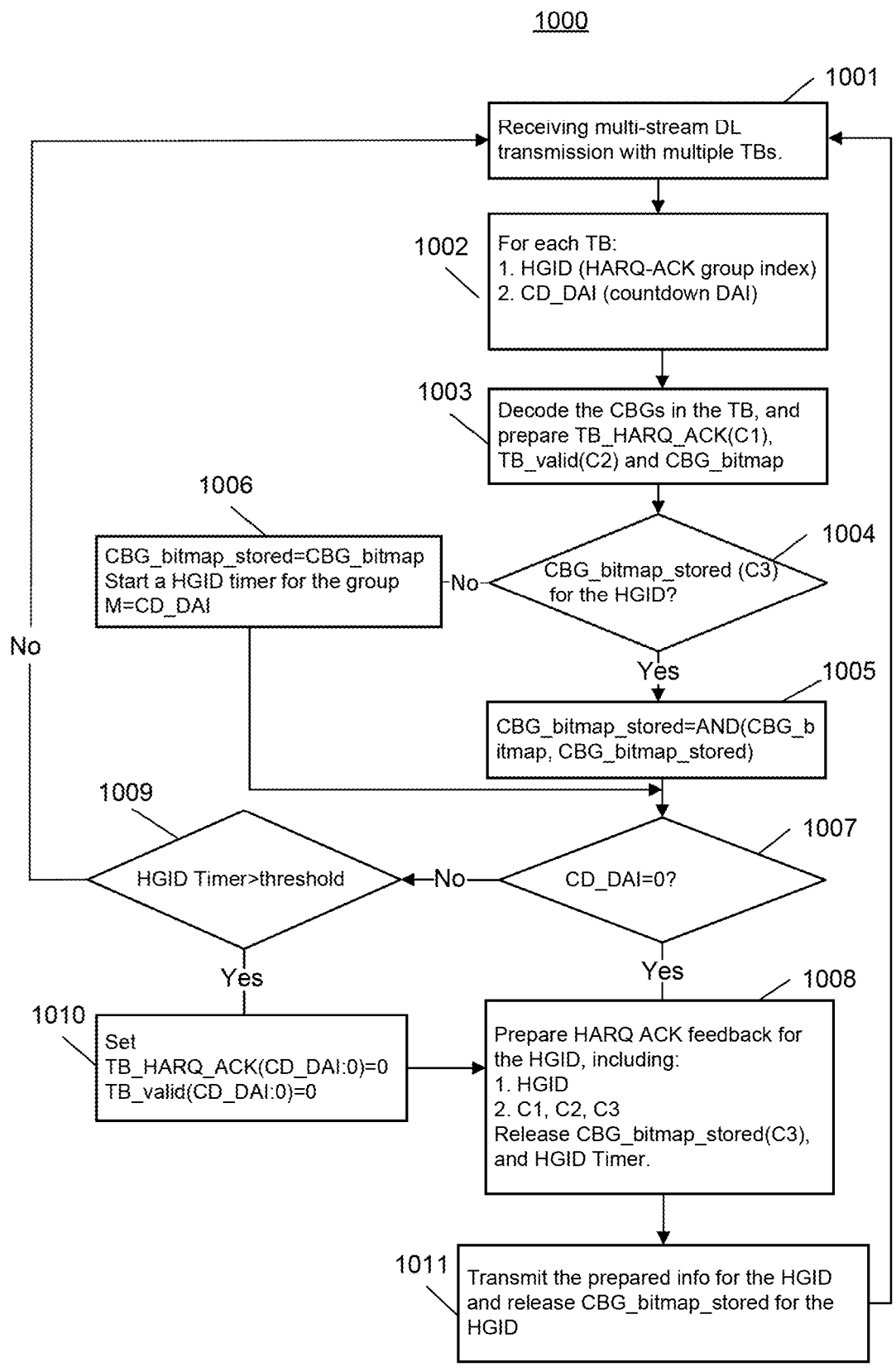
FIG. 10 is a diagram illustrating a group based HARQ-ACK codebook procedure according to embodiments.

FIG. 10 is a diagram illustrating a retransmission method according to embodiments.

According to embodiments, a compressed HARQ-ACK codebook (e.g., the compressed HARQ-ACK codebook design described herein) may be combined with procedures, methods, and features, for example, other than base graph dependent CBG grouping, described herein. According to embodiments, a compressed HARQ-ACK codebook may be combined with a dynamic HARQ-ACK procedure, for example, a HARQ-ACK procedure 1000 described below with reference to FIG. 8. According to embodiments, a transmitter (for example, a gNB) may group HARQ-ACK feedback according to (e.g., based on, using, etc.) beam criteria. For example, TBs and corresponding HARQ-ACK feedback which are transmitted using one beam may be grouped together. According to embodiments, a countdown DAI (CD_DAI) may be used. For example, a WTRU may perform a method including a CD_DAI procedure. According to embodiments, at operation 1001, a WTRU may receive a packet including multiple TBs, for example, via (e.g., through, over, using, etc.) a multi-stream transmission.

According to embodiments, a WTRU may check (e.g., determine) control information for a (e.g., each, all) received TB. According to embodiments, at operation 1002, the WTRU may determine (e.g., consider, read, find, be indicated, etc.) any of the following control information (e.g., fields) corresponding to a (e.g., decoded) TB: (1) HARQ-ACK group index (HGID), for example, a HGID field may be used to indicate HARQ-ACK feedback group, and the HARQ-ACK bits belonging to the same group may be processed and fed back together; and (2) CD_DAI, for example, a CD_DAI field may decrease for each TB transmission, and when a CD_DAI equals 0 (e.g., when the CD_DAI field reaches to 0) a WTRU may (e.g., need to) send HARQ-ACK feedback. According to embodiments, a CD_DAI field may be associated with (e.g., may be dependent or based on) an HGID.

According to embodiments, at operation 1003, a WTRU may decode CBGs in a TB. According to embodiments, a TB HARQ-ACK bit may correspond to a CD_DAI. For example, a WTRU may determine (e.g., configure, calculate, prepare, etc.) a TB HARQ-ACK bit for C1(CD_DAI). According to embodiments, in a case where all CBGs are correctly decoded and a TB level CRC is passed, a corresponding TB HARQ-ACK bit may be set to 1. In a case where one or more CBGs are not correctly decoded, a corresponding TB HARQ-ACK bit may be set to 0.

According to embodiments, a TB valid bit may correspond to a CD_DAI. For example, a WTRU may determine a TB valid bit for a CD_DAI corresponding to C2, that is C2(CD_DAI). According to embodiments, in a case where all CBGs are not correctly decoded, a corresponding TB valid bit may be set to 0. In a case where one or more CBGs are not correctly decoded, a corresponding TB valid bit may be set to 1. In a case where a transmission is missed, a TB valid bit corresponding to a missing CD_DAI may be set to 0. For example, in a case where a WTRU misses a transmission (e.g., the WTRU determines that a previously received CD_DAI—the received CD_DAI>1), the WTRU may set TB valid bits corresponding to missing CD_DAIs to 0.

According to embodiments, a CBG_HARQ_ACK_bitmap may indicate each CBG that is correctly decoded. For example, a WTRU may determine a CBG_HARQ_ACK_bitmap (e.g., ACD_Div) such that each bit in the bitmap indicates whether (or not) a corresponding CBG is correctly decoded.

According to embodiments, a C3 vector may be considered to be valid. For example, at operation 1004, a WTRU may determine (e.g., check) whether a CBG HARQ-ACK bitmap associated with the C3 vector is stored (e.g., the WTRU may determine whether CBG_HARQ_ACK_bitmap_stored (C3) exists for the HGID). However, the present disclosure is not limited thereto, and the WTRU may determine whether a C3 vector is valid according to any similar and/or suitable method. According to embodiments, for each HGID, any of the following may be initialized: a C3 vector, a variable M, a HGID timer. For example, in a case where CBG_HARQ_ACK_bitmap_stored (C3) does not exist, a WTRU may initialize: (1) a C3 vector such that C3=CBG_HARQ_ACK_bitmap; (2) a variable M such that M=CD_DAI+1; and (3) a HGID timer. According to embodiments, in a case where CBG_HARQ_ACK_bitmap_stored (C3) exists, a WTRU may configure the C3 vector such that C3=AND(C3, CBG_HARQ_ACK_bitmap). According to embodiments a logical AND operation of two vectors may perform a logical AND on each pair of components of each of the two vectors (e.g., C3 and CBG_HARQ_ACK_bitmap) and may return a vector with the same size.

According to embodiments, a CD_DAI may be (e.g., equal to) 0. For example, a WTRU may determine whether a received CD_DAI equals 0. In a case where a CD_DAI is zero, (e.g., a WTRU determines that a received CD_DAI equals 0), HARQ ACK feedback for multiple TBs may be generated and fed back. For example, a WTRU mahy compress (e.g., generate, prepare) HARQ-ACK feedback for multiple TBs and may transmit the HARQ-ACK feedback. According to embodiments, the compressed HARQ-ACK feedback may be used to determine CBGs that are not correctly decoded. According to embodiments, the HARQ-ACK feedback may include information indicating any of (1) a HGID or (2) any of vectors C1, C2, or C3. For example, in addition to the HARQ-ACK feedback, a WTRU may provide (e.g., include, transmit, etc.) a HGID and vectors C1, C2, and C3. In a case where a CD_DAI is zero, any of a stored CBG bitmap, a vector C3, or a HGID timer may be reset (e.g., may be initialized, zeroed, released, etc.). For example, in a case where a WTRU determines that a received CD_DAI equals 0, the WTRU may release any of CBG_bitmap_stored, C3, or a HGID timer.

According to embodiments, in a case where a CD_DAI is not zero, (e.g., a WTRU determines that a received CD_DAI does not equal 0), a WTRU may determine whether an HGID timer (e.g., a value indicated by the HGID timer) exceeds a threshold. According to embodiments, the threshold may be configured, predefined, predetermined, etc. For example, the threshold may be any of configurable and/or signaled by any of a network or a base station (e.g., eNB, gNB, etc.).

According to embodiments, if the HGID timer exceeds the threshold, a remainder of TBs may be considered as lost (e.g., not received). For example, in a case where the HGID timer exceeds the threshold, a WTRU may consider the rest of TBs to be lost and may set TB_HARQ_ACK(CD_DAI:0)=0 (e.g., may set C1(CD_DAI:0)=0) and may set TB_valid(CD_DAI:0)=0 (e.g., C2(CD_DAI:0)=0). According to embodiments, the WTRU may send (e.g., transmit, feedback, etc.) the HGID and vectors C1, C2, and C3 back to the gNB. According to embodiments, in a case where the HGID timer exceeds the threshold, a WTRU may release any of CBG_bitmap_stored, a vector C3, or a HGID timer. According to embodiments, if the HGID timer does not exceed the threshold, a WTRU may wait for more packets before performing (e.g., providing, transmitting, generating, etc.) feedback.

Figure 11:
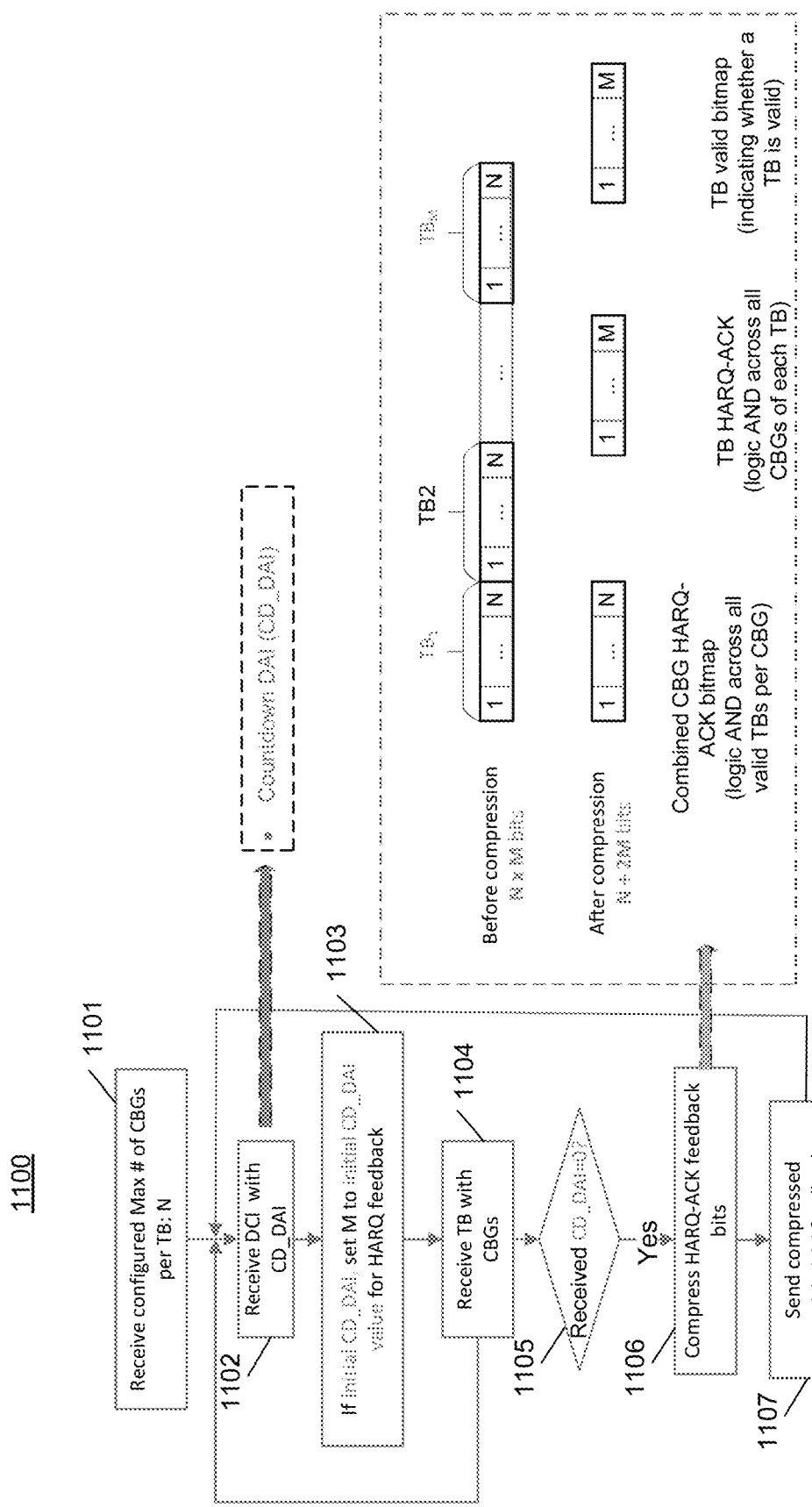
FIG. 11 is a diagram illustrating a HARQ-ACK codebook with a countdown (CD) downlink assignment index (DAI) according to embodiments.

FIG. 11 is a diagram illustrating a retransmission method according to embodiments.

According to embodiments, a retransmission method 1100 may be a simplified procedure as compared to the retransmission method 1000 of FIG. 10. Referring to FIG. 11, at operation 1101, a WTRU may receive a configuration, wherein a maximum number of CBGs per TB is N.

According to embodiments, at operation 1012, a WTRU may receive DCI with a CD_DAI. The CD_DAI field may be decreasing for each TB transmission, or in other words, may decrease in each subsequent TB transmission. According to embodiments, when the CD_DAI is zero (e.g., when the field decreases or reaches to 0, a WTRU may (e.g., need to) send the feedback. According to embodiments, the CD_DAI field may be HGID dependent. According to embodiments, at operation 1103, in a case where the CD_DAI is an initial CD_DAI, a variable M may be set to the initial CD_DAI value for HARQ feedback.

According to embodiments, at operation 1104, a WTRU may receive a TB with CBGs, and the WTRU may decode the TB with CBGs corresponding to the DCI.

According to embodiments, at operation 1105, a WTRU may determine whether the CD_DAI is 0. In a case where the CD_DAI is zero, at operation 1106, the WTRU may compress HARQ-ACK feedback using the vectors C1, C2, C3. At operation 1107, the WTRU may transmit the HARQ-ACK feedback (e.g., the WTRU may send the compressed HARQ-ACK bits back). According to embodiments, in a case where the CD_DAI is not zero, a WTRU may record the HARQ-ACK results and may continue to monitor for a next TB.

According to embodiments, as discussed with reference to FIGS. 10 and 11, a CD_DAI may be utilized. However, the present disclosure is not limited thereto, and a procedure similar to that as described above may be used for any of a counter DAI or a total DAI, for example, with some modification. According to embodiments, a CD_DAI decreases and a CD_DAI may be used as indices for vectors C1 or C2. According to embodiments, an increasing index may be calculated from a CD_DAI and a variable M may be used as indices for the vectors C1 or C2. According to embodiments, a HGID timer may be used in a case where a TB with CD_DAI=0 is missed. In such a case, the HGID timer may (e.g., provide a mechanism to) allow a WTRU to feedback HARQ-ACK information within a given time slot.

UL CBG Based Transmission

In the case of CBG based uplink transmission, the retransmission and soft buffer may be CBG based, but PDCCH signaling may be TB based. Accordingly, in the case of an LTE deployment, an LTE UL (re)transmission procedure may not be proper for CBG based (re)transmissions.

Figure 12:
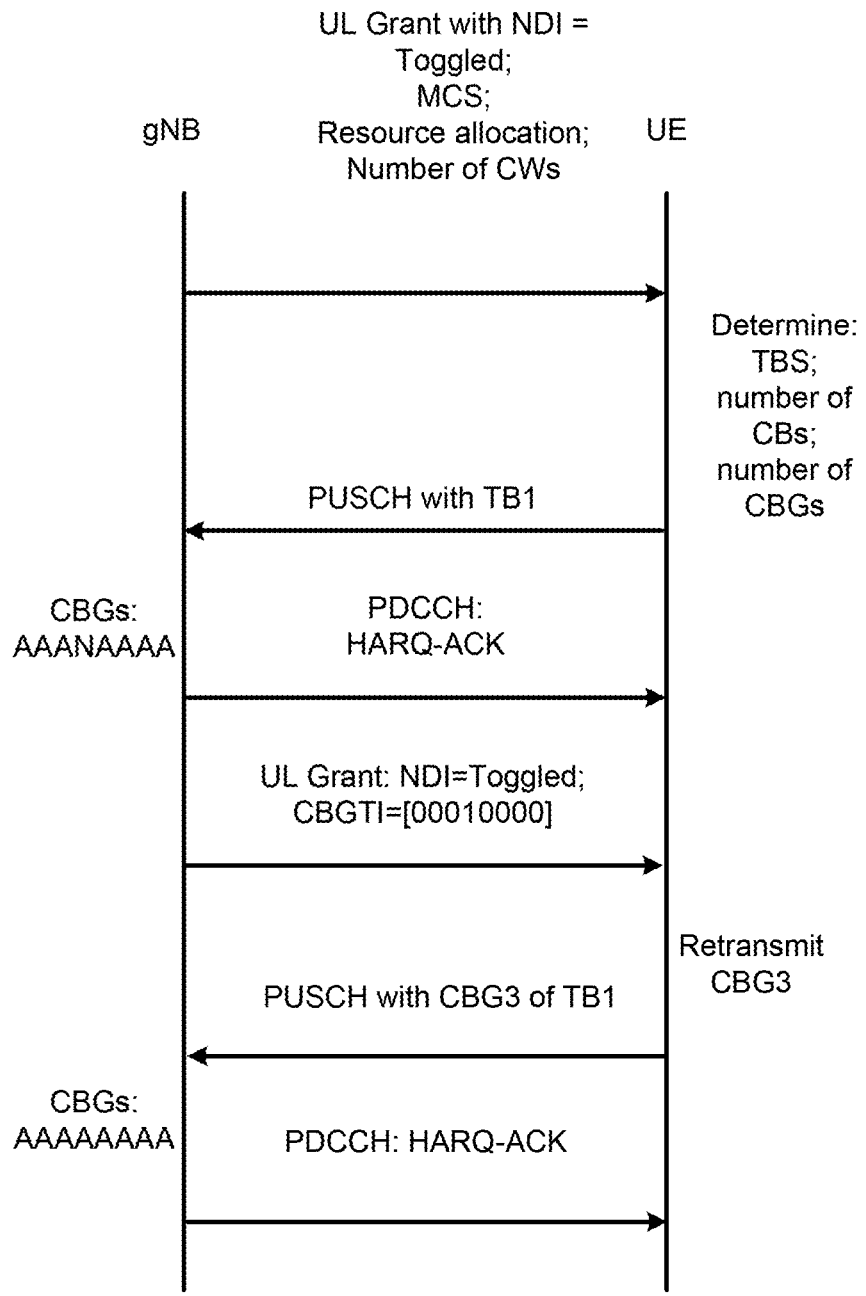
FIG. 12 is a diagram illustrating a UL CBG transmission procedure according to embodiments.

FIG. 12 is a diagram illustrating a UL CBG transmission procedure according to embodiments.

According to embodiments, as shown in FIG. 12, a procedure for a UL CBG based transmission with a grant may include the following operations. According to embodiments, at operation 1201, a gNB may transmit a grant for a WTRU using a PDCCH. According to embodiments, the grant may include any of the following information: (1) NDI, for example, this field may be used to indicate the grant is for a new transmission or a retransmission, wherein a fixed NDI or a toggled NDI mechanism may be used; (2) MCS, for example, modulation and coding scheme of the grant uplink transmission; (3) resource allocation; (4) number of data streams and number of CWs; (5) RV; or (6) CBGTI, for example, indicating which CBG is transmitted. According to embodiments, at operation 1202, the WTRU may receive the grant, and may determine any of: (1) a TB size to fit in the resources allocated with the targeting MCS; (2) a number of CBs; or (3) a number of CBGs.

According to embodiments, at operation 1203, the WTRU may transmit a PUSCH with one or more TBs. According to embodiments, at operation 1204, a gNB may receive the PUSCH and decode it. According to embodiments, the gNB may record information indicating CBGs that are decoded successfully. According to embodiments, at operation 1205, the gNB may transmit a CBG based HARQ-ACK to the WTRU. According to embodiments, in a case where one or more CBGs are in error, the gNB may transmit a UL grant to request a CBG based retransmission. According to embodiments, the information carried in the grant may be like the information carried in the grant for the initial transmission. According to embodiments, the CBGTI may indicate one or more CBGs that are requested for retransmission. According to embodiments, at operation 1206, the WTRU may retransmit the CBGs requested, for example, upon reception of the UL grant. According to embodiments, the procedure may continue until all CBGs may be successfully detected.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for compressing hybrid automatic repeat request acknowledgement (HARQ-ACK) feedback associated with code block group (CBG) data performed by a wireless transmit/receive unit (WTRU), the method comprising:
   receiving, by the WTRU, configuration information indicating a maximum number of CBGs per transport block (TB);
   receiving, by the WTRU, downlink control information (DCI) associated with a plurality of transport blocks (TBs);
   receiving, by the WTRU, one or more TBs of the plurality of TBs, wherein each respective TB includes two or more CBGs;
   generating, by the WTRU, compressed HARQ-ACK feedback information by compressing HARQ-ACK feedback bits associated with the plurality of TBs based on the maximum number of CBGs per TB and the DCI; and
   transmitting the compressed HARQ-ACK feedback information, wherein the compressed HARQ-ACK feedback information includes: (1) a TB HARQ-ACK bitmap that indicates, for each of the plurality of TBs, whether all of the CBGs included in the respective TB are correctly decoded, (2) a TB valid bitmap that indicates, for each of the plurality of TBs, whether the respective TB is valid and includes at least one CBG that is correctly decoded; and (3) a CBG HARQ-ACK bitmap that indicates, for each of the maximum number of CBGs, whether a respective CBG is correctly decoded in each of the valid TBs.

2. The method of claim 1, further comprising:
   receiving information indicating compressed HARQ-ACK feedback is to be provided for the plurality of TBs.

3. The method of claim 1, further comprising:
determining whether each of the two or more CBGs included in a respective TB of the one or more TBs is correctly decoded.

4. The method of claim 1, further comprising:
generating the HARQ-ACK feedback bits for the maximum number of CBGs for each of the plurality of TBs.

5. The method of claim 4, wherein the generating of the compressed HARQ-ACK feedback information includes generating the TB HARQ-ACK bitmap, the TB valid bitmap, and the CBG HARQ-ACK bitmap.

6. The method of claim 1, wherein the receiving of the DCI includes receiving a first DCI including an initial countdown downlink assignment index, and wherein a number of the plurality of TBs associated with the HARQ-ACK feedback bits is set to a value of the initial countdown downlink assignment index.

7. The method of claim 6, wherein the receiving of the DCI includes receiving a second DCI, and
wherein the generating of the compressed HARQ-ACK feedback information is based on a determination that a countdown downlink assignment index included in the second DCI is zero.

8. The method of claim 1, wherein the generating of the compressed HARQ-ACK feedback information is based on a determination that a HARQ-ACK group index timer exceeds a threshold value.

9. The method of claim 1, wherein the compressed HARQ-ACK feedback information includes a number of bits equal to two times a number of the plurality of TBs plus the maximum number of CBGs per TB.

10. The method of claim 1, wherein each respective TB includes a number of CBGs which are less than or equal to the maximum number of CBGs per TB.

11. A wireless transmit/receive unit (WTRU) for receiving a transmit block (TB) including code block group (CBG) data and compressing hybrid automatic repeat request acknowledgement (HARQ-ACK) feedback bits, the WTRU comprising:
a processor, a memory, and a transceiver configured to:
receive configuration information indicating a maximum number of code block groups (CBGs) per transport block (TB),
receive downlink control information (DCI) associated with a plurality of TBs,
receiving, by the WTRU, one or more TBs of the plurality of TBs, wherein each respective TB includes two or more CBGs,
generate compressed hybrid automatic repeat request acknowledgement (HARQ-ACK) feedback information by compressing HARQ-ACK feedback bits associated with the plurality of TBs based on the maximum number of CBGs per TB and the DCI, and
transmit the compressed HARQ-ACK feedback information, wherein the compressed HARQ-ACK feedback information includes: (1) a TB HARQ-ACK bitmap that indicates, for each of the plurality of TBs, whether all of the CBGs included in the respective TB are correctly decoded, (2) a TB valid bitmap that indicates, for each of the plurality of TBs, whether the respective TB is valid and includes at least one CBG that is correctly decoded; and (3) a CBG HARQ-ACK bitmap that indicates, for each of the maximum number of CBGs, whether a respective CBG is correctly decoded in each of the valid TBs.

12. The WTRU of claim 11, wherein the processor, the memory, and the transceiver are configured to:
receive information indicating compressed HARQ-ACK feedback is to be provided for the plurality of TBs.

13. The method of claim 11, wherein the processor, the memory, and the transceiver are configured to:
determine whether each of the two or more CBGs included in a respective TB of the one or more TBs is correctly decoded.

14. The method of claim 11, wherein the processor, the memory, and the transceiver are configured to:
generate the HARQ-ACK feedback bits for the maximum number of CBGs for each of the plurality of TBs.

15. The method of claim 14, wherein the processor, the memory, and the transceiver are configured to generate the compressed HARQ-ACK feedback information which includes to generate the TB HARQ-ACK bitmap, the TB valid bitmap, and the CBG HARQ-ACK bitmap.

16. The method of claim 11, wherein the processor, the memory, and the transceiver are configured to receive the DCI which includes to receive a first DCI including an initial countdown downlink assignment index, and wherein a number of the plurality of TBs associated with the HARQ-ACK feedback bits is set to a value of the initial countdown downlink assignment index.

17. The method of claim 16, wherein the processor, the memory, and the transceiver are configured to receive the DCI which includes to receive a second DCI, and
wherein the processor, the memory, and the transceiver are configured to determine to generate the compressed HARQ-ACK feedback information based on a countdown downlink assignment index included in the second DCI being zero.

18. The method of claim 11, wherein the processor, the memory, and the transceiver are configured to determine to generate the compressed HARQ-ACK feedback information based on a HARQ-ACK group index timer exceeding a threshold value.

19. The method of claim 11, wherein the compressed HARQ-ACK feedback information includes a number of bits equal to two times a number of the plurality of TBs plus the maximum number of CBGs per TB.

20. The method of claim 11, wherein each respective TB includes a number of CBGs which are less than or equal to the maximum number of CBGs per TB.

* * * * *